US009745198B2

(12) United States Patent
Leventis et al.

(10) Patent No.: US 9,745,198 B2
(45) Date of Patent: Aug. 29, 2017

(54) POROUS NANOSTRUCTURED POLYIMIDE NETWORKS AND METHODS OF MANUFACTURE

(71) Applicant: Aerogel Technologies, LLC, Glendale, WI (US)

(72) Inventors: Nicholas Leventis, Rolla, MO (US); Chariklia Sotiriou-Leventis, Rolla, MO (US); Chakkaravarthy Chidambareswarapattar, Rolla, MO (US)

(73) Assignee: Aerogel Technologies, LLC, Glendale, WI (US)

( * ) Notice: Subject to any disclaimer, the term of this patent is extended or adjusted under 35 U.S.C. 154(b) by 0 days.

(21) Appl. No.: 14/261,399

(22) Filed: Apr. 24, 2014

(65) Prior Publication Data

US 2014/0322122 A1 Oct. 30, 2014

Related U.S. Application Data

(63) Continuation of application No. 13/214,633, filed on Aug. 22, 2011, now abandoned.
(Continued)

(51) Int. Cl.
*C01B 31/36* (2006.01)
*B82Y 30/00* (2011.01)
(Continued)

(52) U.S. Cl.
CPC ............. *C01B 31/36* (2013.01); *B82Y 30/00* (2013.01); *B82Y 40/00* (2013.01); *C01B 31/00* (2013.01);
(Continued)

(58) Field of Classification Search
CPC .................................................. C08G 73/1003
See application file for complete search history.

(56) References Cited

U.S. PATENT DOCUMENTS

| 7,074,880 B2 | 7/2006 | Rhine et al. |
| 2004/0132845 A1* | 7/2004 | Rhine ................... B01J 13/0091 521/82 |
| 2007/0292732 A1* | 12/2007 | Feaver ................... B82Y 30/00 429/421 |

OTHER PUBLICATIONS

Avadhani, C.V.; Chujo, Y. Poly(amide-imide)-Silica Gel Hybrids: Synthesis and Characterization. Journal of Macromolecular Science, Part A: Pure and Applied Chemistry (2009) 46, 663-673.*
(Continued)

*Primary Examiner* — Mike M Dollinger
*Assistant Examiner* — Christina Wales
(74) *Attorney, Agent, or Firm* — Wolf, Greenfield & Sacks, P.C.

(57) ABSTRACT

Porous three-dimensional networks of polyimide and porous three-dimensional networks of carbon and methods of their manufacture are described. For example, polyimide aerogels are prepared by mixing a dianhydride and a diisocyanate in a solvent comprising a pyrrolidone and acetonitrile at room temperature to form a sol-gel material and supercritically drying the sol-gel material to form the polyimide aerogel. Porous three-dimensional polyimide networks, such as polyimide aerogels, may also exhibit a fibrous morphology. Having a porous three-dimensional polyimide network undergo an additional step of pyrolysis may result in the three dimensional network being converted to a purely carbon skeleton, yielding a porous three-dimensional carbon network. The carbon network, having been derived from a fibrous polyimide network, may also exhibit a fibrous morphology.

19 Claims, 23 Drawing Sheets

Related U.S. Application Data

(60) Provisional application No. 61/375,656, filed on Aug. 20, 2010.

(51) Int. Cl.

| | | |
|---|---|---|
| *B82Y 40/00* | (2011.01) | |
| *C01B 31/00* | (2006.01) | |
| *C08G 73/10* | (2006.01) | |
| *C08J 9/28* | (2006.01) | |
| *C08L 79/08* | (2006.01) | |
| *C08G 18/76* | (2006.01) | |
| *C08G 18/32* | (2006.01) | |
| *C08G 18/34* | (2006.01) | |
| *H01G 11/38* | (2013.01) | |
| *C01B 31/08* | (2006.01) | |
| *C01B 31/30* | (2006.01) | |
| *C08G 101/00* | (2006.01) | |

(52) U.S. Cl.
CPC .............. *C01B 31/08* (2013.01); *C01B 31/30* (2013.01); *C08G 18/3243* (2013.01); *C08G 18/346* (2013.01); *C08G 18/7671* (2013.01); *C08G 73/1003* (2013.01); *C08G 73/1035* (2013.01); *C08G 73/1067* (2013.01); *C08J 9/28* (2013.01); *C08L 79/08* (2013.01); *H01G 11/38* (2013.01); *C08G 2101/0091* (2013.01); *C08J 2201/0502* (2013.01); *C08J 2205/026* (2013.01); *C08J 2375/04* (2013.01); *Y02E 60/13* (2013.01)

(56) References Cited

OTHER PUBLICATIONS

Kim, K.I.; An, J.H.; Lee, J.Y.; Kim, J.H. Micro/Nano Multi-Porous Films Assembled by Supercritical Technology. PMSE preprints, 2003.*

Barikani, M.; Atai, S.M. Preparation and Properties of Polyimides and Polyamide-imides from Diisocyanates. J. Polym. Sci. Part A. 1999, 37, 2245-2250.*

Chidambareswarapattar, C.; Sotiriou-Leventis, C.; Leventis, N. One-step polyimide aerogels from anhydrides and isocyanates. Polymer Preprints, 2010, 51(2), 638.*

Avadhani et al., Poly(amide-imide)-silica gel hybrids: synthesis and characterization. J Macromol Sci Part A. 2009;46:663-673.

Barikani et al., Preparation and properties of polymide-imides from diisocyanates. J Polym Sci Part A. 1999;37:2245-2250.

Kim et al., Micro/nano multi-porous films assembled by supercritical technology. Proceedings by the American Chemical Society. 2003:1-2.

Pierre et al., Chemistry of aerogels and their applications. Chem Rev. Nov. 2002;102(11):4243-65.

Leventis, et al., "Pyrolytic conversion of organic aerogels into monolithic meso- and macroporous carbon," 217th ECS Meeting, Vancouver, Canada, Apr. 26, 2010 (Abstract #1503).

\* cited by examiner

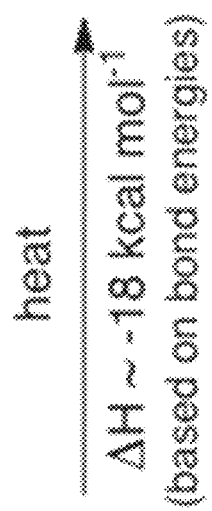
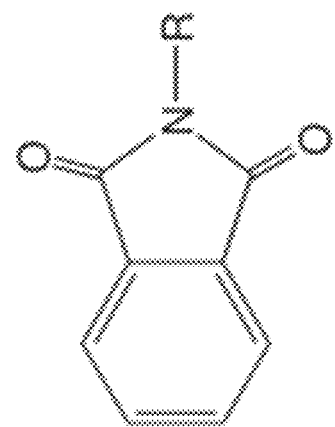
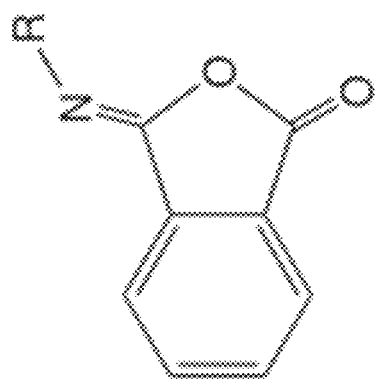
Fig. 4

POROUS NANOSTRUCTURED POLYIMIDE NETWORKS AND METHODS OF MANUFACTURE

RELATED APPLICATIONS

This application is a continuation of U.S. application Ser. No. 13/214,633, filed Aug. 22, 2011, entitled "Porous Nanostructured Polyimide Networks and Methods of Manufacture," by Nicholas Leventis et al., which claims priority to U.S. Provisional Patent Application Ser. No. 61/375,656, filed Aug. 20, 2010, entitled "Porous Nanostructured Polyimide Networks and Methods of Manufacture," by Leventis et al., each of which is incorporated herein by reference in its entirety.

FEDERALLY SPONSORED RESEARCH

Research leading to various aspects of embodiments presented herein were sponsored, at least in part, by the National Science Foundation, Grant No. CHE-0809562 and Grant No. CMMI-0653919. The United States Government may have certain rights in the invention.

BACKGROUND

1. Field

Aspects herein relate to nanostructured polyimide networks, carbonized derivatives, related materials, uses thereof, and methods of manufacture.

2. Discussion of Related Art

Three-dimensional porous architectures are a desirable form factor for many materials as they allow installation of new properties into a material not possessed by the non-porous form of a material. Porous architectures possessing nanostructured features, such as nanopores or nanoparticulate solid frameworks, are further desirable in many cases as they can possess new and/or more extreme properties than porous architectures without nanostructured features.

Aerogels are an example of a porous architecture possessing nanostructured features. Aerogels are materials comprised of three-dimensional assemblies of nanoparticles or nanostructures that exhibit high materials and ultra-low densities Aerogel materials are typically produced by forming a gel that includes a porous solid component and a liquid component and then removing the liquid component by supercritically, subcritically, or freeze drying the wet gel to isolate the porous solid component. This porous solid component is an aerogel. Supercritical drying involves the liquid being transformed into a fluid above its critical point and removing the fluid while leaving the porous solid structure generally intact. Subcritical drying involves evaporation of the liquid below its critical point in a way that leaves the porous solid structure generally intact. Freeze drying involves freezing of the liquid component and sublimation of the resulting solid in a way that leaves the porous solid structure generally intact.

The large internal void space in aerogels and other nanostructured and non-nanostructured three-dimensional porous networks generally provides for a low dielectric constant, a low thermal conductivity, and a high acoustic impedance. These materials have been considered for a number of applications including thermal insulation, lightweight structures, and impact resistance.

SUMMARY

Articles and methods for manufacturing three-dimensional porous polyimide networks and three-dimensional porous carbon networks are described.

Three-dimensional porous polyimide networks can be prepared by mixing a dianhydride and a diisocyanate in a solvent comprising a pyrrolidone and acetonitrile at room temperature to form a sol-gel material and subsequently drying the sol-gel material to form a polyimide aerogel. Drying may be performed supercritically, subcritically, or by freeze drying. In some embodiments, a polyimide aerogel manufactured by methods described herein may have a fibrous morphology which may or may not also include particulate features.

Three-dimensional porous carbon network aerogels may also be manufactured from polyimide aerogels through a conversion step. Once a polyimide aerogel is formed, the aerogel may be subjected to a pyrolysis step, giving rise to a carbon skeleton in the aerogel, hence, a carbon aerogel. In some embodiments, a polyimide aerogel having a fibrous morphology that is subject to the pyrolysis step may give rise to a carbon aerogel also having a fibrous morphology.

In some cases, three-dimensional porous polyimide networks not considered aerogels may be produced. Likewise, three-dimensional porous carbon networks not considered aerogels may be derived from such three-dimensional polyimide networks.

Various embodiments of the present invention provide certain advantages. Not all embodiments of the invention share the same advantages and those that do may not share them under all circumstances.

Further features and advantages of the present invention, as well as the structure of various embodiments of the present invention are described in detail below with reference to the accompanying drawings.

BRIEF DESCRIPTION OF DRAWINGS

The accompanying drawings are not intended to be drawn to scale. For purposes of clarity, not every component may be labeled in every drawing. Various embodiments of the invention are described, by way of example, in the accompanying drawings. In the drawings:

FIG. 4 illustrates a reaction step in forming a three-dimensional porous polyimide network in accordance with some embodiments;

DETAILED DESCRIPTION

Figure 1:
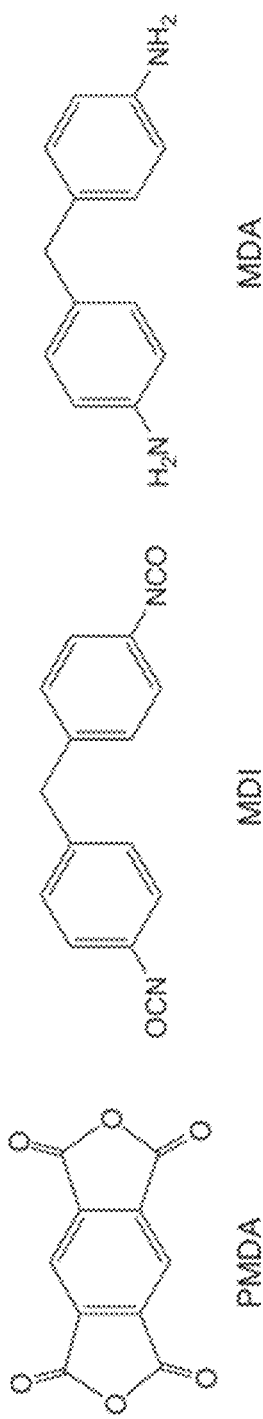
FIG. 1 depicts chemical structures for PMDA, MDI and MDA.

Porous three-dimensional networks of polyimide and porous three-dimensional networks of carbon and methods of their manufacture are described herein. In some embodiments, three-dimensional porous polyimide networks (e.g., aerogels) are prepared by mixing a dianhydride and a diisocyanate in a solvent comprising a pyrrolidone and an acetonitrile at room temperature to form a sol-gel material. The sol-gel material may be dried supercritically or subcritically so as to form the three-dimensional porous polyimide network. The three-dimensional porous polyimide network may also exhibit a fibrous morphology. In some embodiments, the three-dimensional porous polyimide network may be subject to an additional step of pyrolysis resulting in the three dimensional network of polyimide being converted to a carbon skeleton, yielding a three-dimensional porous carbon network. The three-dimensional porous carbon network, having been derived from a fibrous three-dimensional porous polyimide network, may also exhibit a fibrous morphology.

Three-dimensional porous polyimide networks may be prepared via a one-step room-temperature synthesis route involving reaction of a dianhydride with a diisocyanate. Using an isocyanate to form the polyimide network using methods described herein provides certain advantages: a) $CO_2$ is the only substantial byproduct; b) sacrificial dehydrating agents (e.g., acetic anhydride/pyridine) are not required for gelation; c) gelation and imidization take place at room temperature and, thus, post-gelation curing at high temperatures (e.g., 190° C.) in order to complete imidization is not required; d) use of isocyanates is cheaper than use of amines from the traditional route; e) higher density bifunctional aerogels for dual-purpose applications (e.g. thermal insulators that are also used as structural components; impact dampening materials that are also used as structural components) are easily accessible with no solubility issues in turn extending the accessible density range upwards, while the polyamic acid route encounters solubility issues at higher concentration sols; and f) an entangled fiber nanomorphology stabilizes the nanostructure, extending the accessible density range downwards.

Three-dimensional porous polyimide networks such as polyimide aerogels may be manufactured using a route that involves condensation of a dianhydride and a diamine to form a polyamic acid solution that is dehydrated with an anhydride to form polyimide. In some cases, use of a sacrificial dehydration step is generally expensive with respect to the cost of materials and removal of the byproducts. A further complication may be the kinetic formation of isoimides which can be converted to more thermodynamically stable imides by high-temperature treatment. To accommodate this, the dehydration step may be carried out at elevated temperatures directly (>130° C.). Preparation of certain polyimide aerogels are described in U.S. Pat. No. 7,074,880 entitled "Polyimide aerogels, carbon aerogels, and metal carbide aerogels and methods of making same" and is incorporated herein by reference in its entirety.

Polyimide aerogels synthesized via a conventional route using diamine (PI-AMN) as compared to routes contemplated by the inventors and described herein using isocyanate (PI-ISO) may have similar surface areas (e.g., for 20% solid formulation PI-ISO: 351 $m^2$/g, density=0.196 g/$cm^3$; PI-AMN: 377 $m^2$/g, density=0.291 g/$cm^3$). However, the nanomorphologies of polyimide aerogels prepared using isocyanate may be completely different from nanomorphologies of polyimide aerogels prepared using diamine. For example, for a similar chemical composition, PI-ISO may have a fibrous morphology, while PI-AMN have a particulate morphology. In general, PI-ISO may also be more robust and may shrink less compared to PI-AMN. Upon pyrolysis, polyimide aerogels can be converted to carbon aerogels which may retain the main morphological characteristics (fibrous versus particulate) of their parent polyimide aerogels.

Three-dimensional porous polyimide networks such as polyimide aerogels synthesized through the isocyanate route are less prone to shrinkage during processing compared to polyimide aerogels synthesized through the diamine route; densities as low as 0.04 g/$cm^3$ have been obtained. Further, owing to solubility issues, PI-AMN aerogels generally cannot be made with sols above 20% w/w solids in the sol. Resulting PI-AMN aerogels had a density of 0.291 g/$cm^3$. However, more concentrated sols are possible via the isocyanate route. For example, PI-ISO aerogels from sols with 30% w/w solids had a density of about 0.304 g/$cm^3$. Upon carbonization at 800° C., PI-ISO retain their parent nanomorphology, which may be fibrous. The ability to prepare higher density polyimide aerogels and other three-dimensional porous polyimide networks extends the range of compressive strength and stiffness attainable for polyimide networks and their carbonized derivatives.

Three-dimensional porous polyimide networks such as polyimide aerogels prepared in accordance with methods described herein may exhibit a suitable degree of shrinkage. In some embodiments, three-dimensional porous polyimide networks (e.g., polyimide aerogels) prepared with isocyanate may exhibit a shrinkage of less than 30%, less than 20%, less than 10%, less than 5%, less than 2%, less than 1%. In some cases, the shrinkage of a polyimide aerogel may be affected by the percent solids w/w. For example, when the percentage of solids in the sol is lower, the degree of shrinkage for the polyimide aerogel may be greater.

The density of three-dimensional porous polyimide networks or three-dimensional porous carbon networks prepared from pyrolysis of polyimide networks using methods described herein may be between, for example, about 1 mg/cc and about 550 mg/cc, or between about 100 mg/cc and about 400 mg/cc. In some embodiments, the density of three-dimensional porous polyimide networks or three-dimensional porous carbon networks prepared from pyrolysis of polyimide networks may be greater than about 300 mg/cc.

Aerogels described herein may include a three-dimensional porous network of secondary particles and primary particles. Porous secondary particles having a diameter of between about 5-10 nm are made up of nonporous primary particles having a diameter of less than about 1 nm. While the primary particles are arranged in a manner that forms micropores within the secondary particles, larger mesopores arise through the arrangement of secondary particles relative to one another. A silica nanoparticle network in the form of an aerogel may include mesopores having voids that are between 2-50 nm in diameter between secondary particles. Primary particles include voids that are less than 2 nm in diameter.

Three-dimensional porous networks discussed herein may have fibrous morphologies where the networks may include nanofibers having various diameters and lengths. In some embodiments, fibrous morphologies of such networks include fibers having an average diameter ranging between about 1 nm and about 500 nm (e.g., between about 10 nm and about 400 nm, between about 100 nm and about 300 nm) or less than 500 nm (e.g., less than 400 nm, less than 300 nm, less than 200 nm). In some embodiments, fibrous morphologies of porous networks described herein include fibers having an average length of at least 50 nm and may extend into the micron length scale. The average aspect ratio of fibers in a three-dimensional porous networks having a fibrous morphology, such as an aerogel may be greater than 2, greater than 5, greater than 10, greater than 20, greater than 50, etc. Three-dimensional porous networks described herein that exhibit a fibrous morphology may include both fibrous and non-fibrous features (e.g., particulate), but, in some embodiments, could also contain only fibrous features, free of non-fibrous features.

Any appropriate isocyanate, such as a diisocyanate or triisocyanate, may be used for forming a sol-gel material to produce a three-dimensional porous polyimide network, such as a polyimide aerogel. For example, suitable non-limiting diisocyanates may include 4,4'-diisocyanatodiphenylmethane or methylene di-p-phenyldiisocyanate (MDI).

Any appropriate dianhydride may be used to react with an isocyanate (e.g., diisocyanate, triisocyanate) in forming a sol-gel material to produce a three-dimensional porous polyimide network, for example, a polyimide aerogel. In an embodiment, a suitable non-limiting dianhydride includes pyromellitic dianhydride (PMDA).

A suitable solvent may be used along with the isocyanate and the dianhydride. In various embodiments, a pyrrolidone (e.g., N-methyl-2-pyrrolidone, NMP), acetonitrile, acrylonitrile, acetone, and/or combinations thereof may be used to form a three-dimensional porous polyimide network, such as a polyimide aerogel.

In some embodiments, monolithic polyimide aerogels (PI-ISO) may be prepared by drying wet gels synthesized via a rather underutilized room-temperature reaction of pyromellitic dianhydride (PMDA) with 4,4'-methylene di-p-phenyldiisocyanate (MDI). The reaction may be observed using liquid-phase $^{13}C$-NMR in DMSO-$d_6$ which, for some cases, has indicated that the reaction proceeds through a seven-member ring intermediate that collapses to the imide by expelling $CO_2$. PI-ISO may be characterized and compared with aerogels obtained via the classic reaction of PMDA and 4,4'-methylenedianiline (MDA), referred to as PI-AMN. The two materials, PI-ISO and PI-AMN may be chemically identical, showing similar degrees of crystallinity (30-45%, by XRD), and both including similarly sized primary particles (6.1-7.5 nm, verified by SANS). For some embodiments, they both may contain meso- and macroporosity by $N_2$-sorption porosimetry and may exhibit similar BET surface areas (300-400 $m^2$ $g^{-1}$).

A major difference between PI-AMN and PI-ISO prepared using methods described herein, however, is that PI-AMN are particulate while PI-ISO may be fibrous in morphology. Without being limited to any one particular mechanism, the difference in morphology may be due to the rigidity of the seven-member ring intermediate of PI-ISO. PI-AMN shrinks significantly during processing (up to 40% in linear dimensions), but can exhibit stronger mechanical properties than PI-ISO of the same density. Upon pyrolysis at 800° C., both PI-ISO and PI-AMN have been observed to convert to porous carbons. PI-AMN lose their nanomorphology and more than ⅔ of their surface area, as opposed to PI-ISO, which retains their nanomorphology and surface area. Etching with $CO_2$ at 1000° C. increases the surface area of both PI-AMN and PI-ISO, and improves the electrical conductivity of the latter. In one embodiment, etching resulted in an increase of surface area in PI-AMN to 417 $m^2$/g and an increase in PI-ISO to 1010 $m^2$/g and an increase in electrical conductivity in PI-ISO by a factor of 70. Etching for longer periods of times, with higher flow rates of $CO_2$, and higher temperatures can further increase these values.

Among engineering plastics, polyimides demonstrate good chemical resistance as well as excellent mechanical properties and stability at high temperatures. For example, a special formulation referred to as PMR-15 is emerging as an aerospace industry standard for replacing metal components in jet engines and is rated at 290° C. for 10,000 h. In that regard, polyimide aerogels could be ideal materials for high-temperature low-k dielectrics for fast electronics (where k stands for the dielectric constant), and for high-temperature thermal insulation with advantages over blown closed-cell macroporous polyimide foams already in use for that purpose. As mentioned, polyimide aerogels may be synthesized employing a conventional two-step DuPont route utilizing dianhydrides and diamines. The two monomers react at room temperature yielding a polyamic acid solution that subsequently is dehydrated to the polyimide with acetic anhydride and a base-catalyst (e.g., pyridine or triethylamine). A post-gelation high-temperature treatment of wet gels ensures complete imidization and conversion of undesirable isoimides to imides. Though chemical dehydration of the polyamic acid is energy-intensive and introduces by-products, industrially, dehydration and imidization are carried out by direct heating of the polyamic acid at high temperatures (~200° C.). In an attempt to adapt this direct heating method for the synthesis of aerogels, however, precipitates were obtained rather than gels.

Polyimide aerogels described herein may also be synthesized via a one-step room-temperature route that involves reaction of anhydrides with isocyanates. In some embodiments, pyromellitic dianhydride (PMDA) is reacted with 4,4'-methylene diphenyl diisocyanate (MDI). For contrast, a route involving the reaction of PMDA with 4,4'-methylenedianiline (MDA) will be considered. Resulting aerogels from both routes are chemically identical (by IR and solids CPMAS $^{13}$C-NMR). However, despite similar degrees of crystallinity and primary particle sizes (by XRD and SANS, respectively), their nanomorphology (by SEM) may be quite different: polyimides from the amine route (PI-AMN) are particulate, while those from the isocyanate route (PI-ISO) are fibrous. One of ordinary skill in the art would be able to recognize the difference between a particulate and fibrous morphology. Upon pyrolysis, both kinds of polyimide aerogels may be converted to carbon aerogels, which, in the case of PI-ISO retain the fibrous morphology of their parent polyimides.

Examples

Synthesis of PI-ISO Versus PI-AMN

FIG. 1 illustrates the chemical structures for a number of polyimide aerogel precursors, namely PMDA, MDI and MDA. FIGS. 2a-2c and 3a-3b summarize various embodiments of the synthesis of PI-AMN and PI-ISO aerogels. Typical samples processed under the different conditions discussed below are shown in the figures.

PI-AMN were prepared through a polyamic acid step (see FIGS. 5a and 5b) according to a modification of the Aspen Aerogels adaptation of the classic DuPont route. According to the latter, typically polyamic acid is not isolated from its preparation solution (in N-methyl-2-pyrrolidone, NMP) and is dehydrated either thermally (>190° C.) or chemically at room temperature with acetic anhydride/base (e.g., pyridine, triethylamine, etc.). At first, to improve the Aspen Aerogels protocol that opts for chemical dehydration, bypassing the latter step by direct heating of NMP solutions of the polyamic acid may be performed, yet may result in precipitation rather than gelation. Thus, room-temperature (RT) chemical dehydration was used with acetic anhydride/pyridine. The bulk density of the final aerogels may be varied by successive dilutions of the polyamic acid solution before adding the dehydrating agents. Although addition of the dehydrating agents into the polyamic acid solution induces gelation, in general polyimides obtained by that route required heating at elevated temperatures in order to complete imidization and to convert any kinetically formed isoimides to thermodynamically more stable imides.

Room-temperature PI-AMN gels were solvent-exchanged with ethanol and dried to aerogels (abbreviated as PI-AMN-RT) using liquid $CO_2$ extracted supercritically. Subcritical drying of the aerogels may also be performed. According to IR, PI-AMN-RT aerogels do not contain detectable amounts of isoimide (with expected absorption at 1800 cm$^{-1}$), but the absorption at ~3500 cm$^{-1}$ indicates that they may contain amides and therefore unreacted polyamic acid. Heating PI-AMN-RT aerogels at 190° C. causes extensive shrinkage and results into xerogel-like materials with a loss in surface area. Hence, PI-AMN was heated in a solvent-swollen state, and thus imidization was completed before drying by transferring wet gels into NMP followed by heating at 190° C. Subsequently, wet gels may be cooled to RT, NMP was exchanged with ethanol, and ethanol-filled wet-gels may be supercritically dried with $CO_2$ yielding PI-AMN-190 aerogels. In some cases, even though absorption at ~3500 cm$^{-1}$ decreases, it did not disappear. Further, even by heating in the solvent-swollen state, PI-AMN samples shrink significantly relative to their molds (up to 40% in linear dimensions) irrespective of their bulk density; shrinkage is not caused by the heat treatment at 190° C., as aerogel samples either dried directly after gelation (PI-AMN-RT) or after heating at 190° C. in NMP according to FIGS. 2a and 3a (PI-AMN-190) are similar in size. Rather, shrinkage of PI-AMN samples may be attributed to the innate chemistry of the gel-forming process.

Figure 5A:
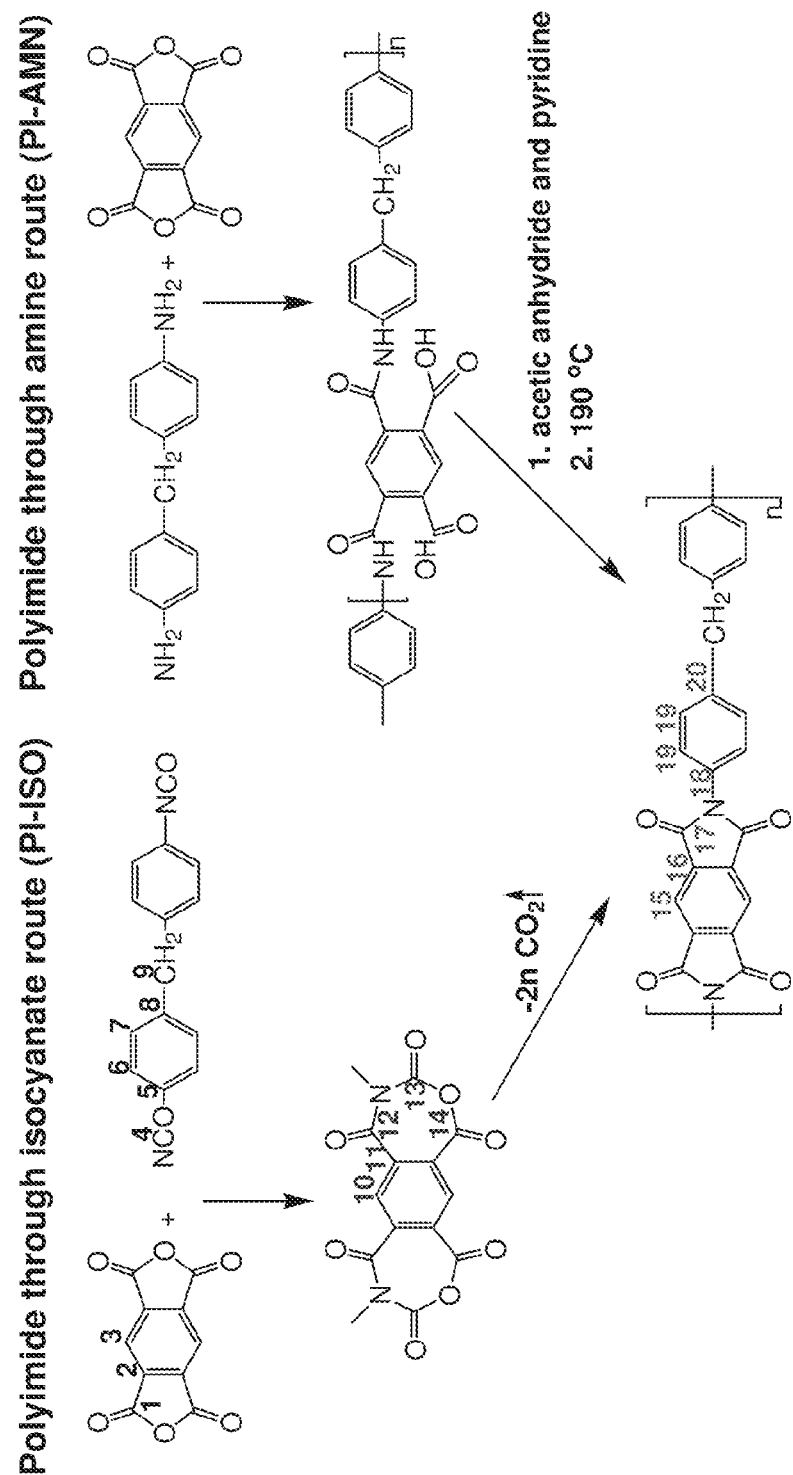
FIG. 5a depicts reactions where a polyimide is formed through isocyanate and amine routes in accordance with some embodiments.
Figure 5B:
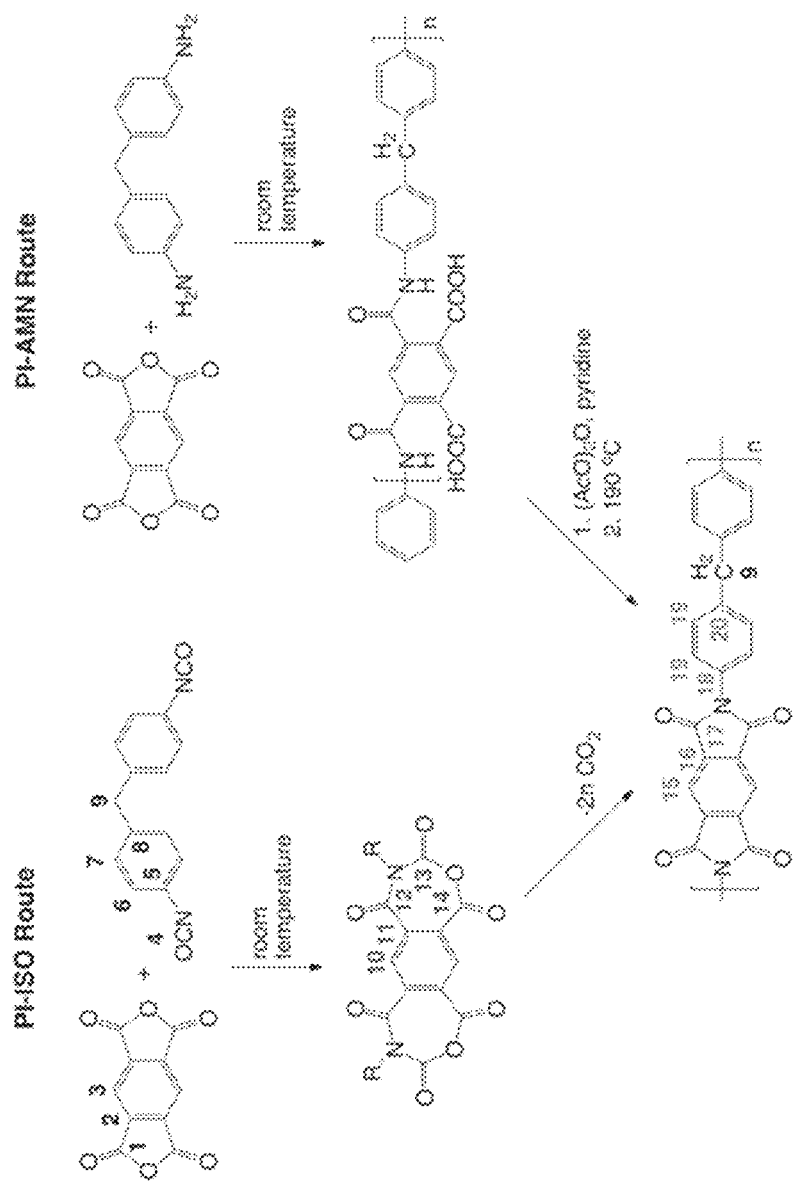
FIG. 5b depicts more reactions where a polyimide is formed through isocyanate and amine routes in accordance with some embodiments.

On the other hand, PMDA/MDI solutions gel directly at room temperature without use of additional reagents. The reaction was followed up to the gelation point using liquid-phase $^{13}$C-NMR in DMSO-d$_6$. As shown in FIGS. 5a and 5b, it can be seen that the reaction proceeds through a seven-member ring intermediate which collapses to the imide by expelling $CO_2$. At the gelation point (~7.5 h), a significant amount of the seven-member ring intermediate remains and still reacts. On the other hand, the reaction may proceed much slower in NMP at RT and gelation may take up to 48 h depending on the monomer concentration. Gelation may be carried out at RT in DMSO. Although PI aerogels are opaque, their wet gel precursors are generally translucent allowing visual inspection of their interior. It can be seen that PI-ISO aerogels obtained from DMSO sols at RT may contain large bubbles ($CO_2$) entrapped in their bulk.

In some embodiments, the seven-member intermediate may be considered an in-situ foaming agent leading to foam-like PI-ISO architectures defined by porous walls. Macroscopically void-free (i.e., bubble-free) PI-ISO aerogel monoliths were obtained by two methods (shown in FIGS. 2b, 3b-3c): either, (a) by RT gelation of PMDA/MDI in mixtures of NMP with DMSO or acetonitrile (samples referred to as PI-ISO-RT); or, (b) by gelation in pure NMP at slightly elevated temperatures by stepwise heating from 60° C. to 90° C. (see FIGS. 2b, 3b-3c, samples referred to as PI-ISO-90). It can be appreciated that other heating arrangements may be possible. The first method combines sufficiently low-viscosity sols with affordable gelation times (30-33 h for the 15% w/w solids formulation) allowing $CO_2$ to be dissipated and bubble formation to be avoided. The second method has the advantage of comparing PI-ISO and PI-AMN prepared in environments of similar polarity (both in NMP); step-wise heating of the PMDA/MDI sol in NMP ensured defect-free monoliths, while direct heating at 90° C. led to foams qualitatively similar to those obtained in DMSO at RT (i.e., with bubbles). All gels were aged ~4× their gelation time in their molds, were solvent-exchanged with ethanol, and supercritically dried with $CO_2$.

Figure 9:
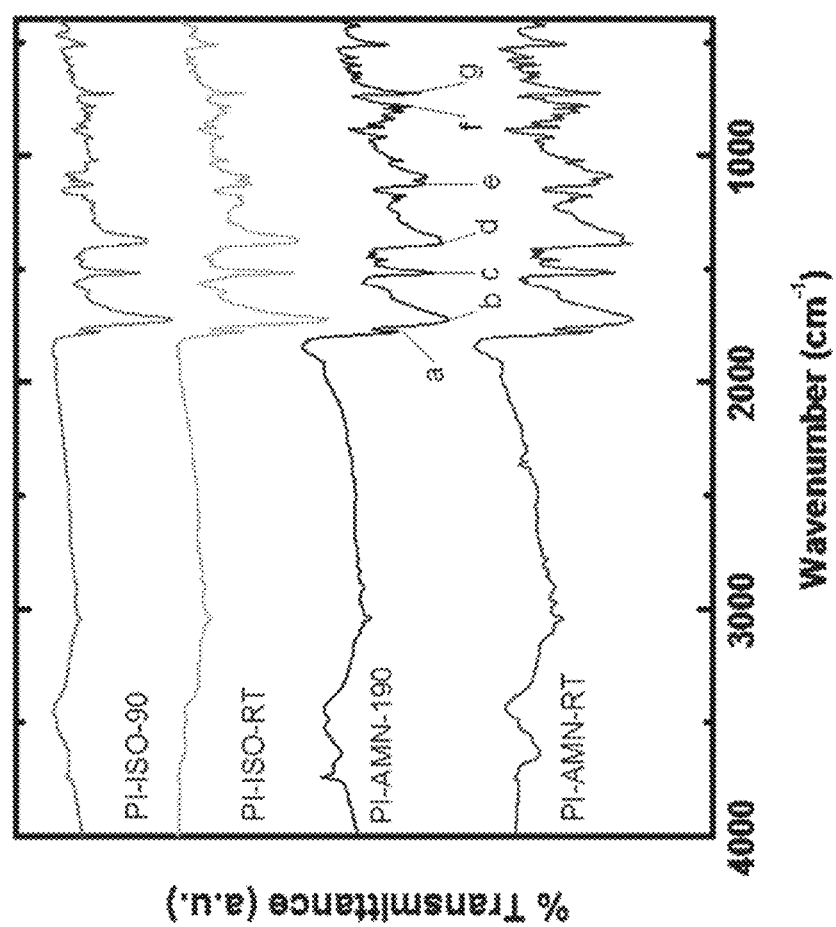
FIG. 9 depicts an infrared (IR) spectra of polyimide aerogels prepared in accordance with some embodiments.

IR spectra of PI-ISO-RT look essentially identical to IR spectra of PI-AMN-190, but the solid-state $^{13}$C-NMR spectra of the two materials show differences in the relative peak intensities which are attributed to differences in polymer length and therefore to the polarity of the sol (as a reminder, PI-ISO-RT were prepared in NMP/acetonitrile or NMP/DMSO mixtures, while PI-AMN-190 were prepared in pure NMP). FIG. 9 shows IR spectra of polyimide aerogel samples where peak assignments include: a, b (1777 cm$^{-1}$ and 1723 cm$^{-1}$) asymmetric and symmetric stretching vibrations of C=O; c (1511 cm$^{-1}$) aromatic ring breathing modes; d (1366 cm$^{-1}$) C—N—C imide ring stretching; e, f (1123 cm$^{-1}$ and 780 cm$^{-1}$) imide ring vibrations; and g (723 cm$^{-1}$) imide ring bending.

Figure 7:
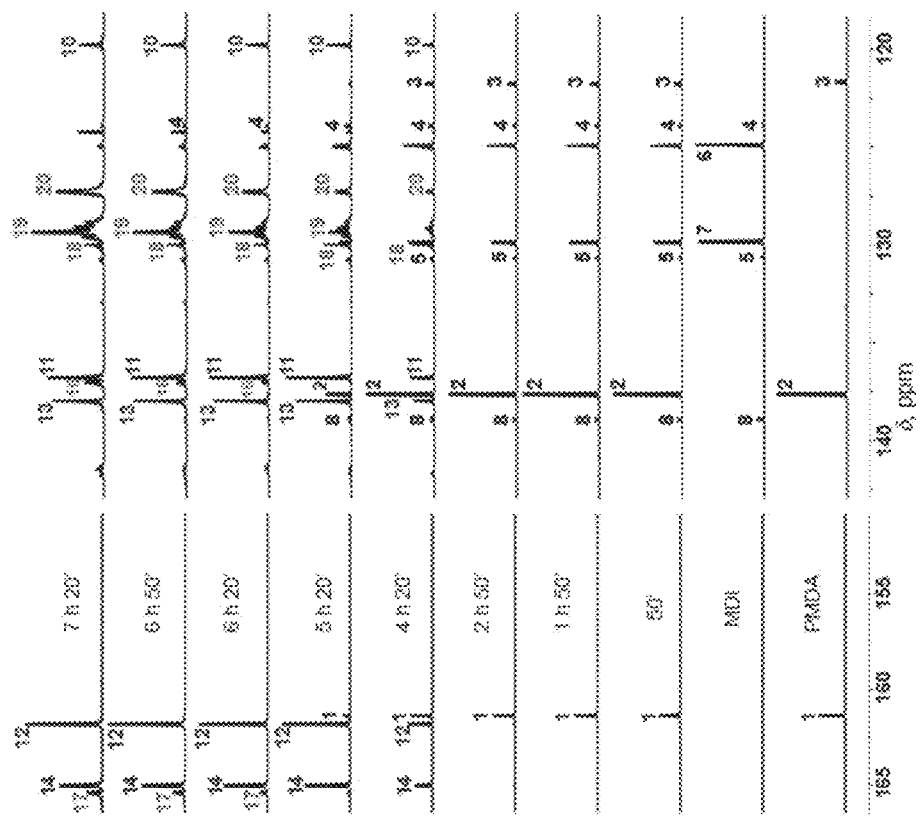
FIG. 7 shows a nuclear magnetic resonance (NMR) spectra of a PMDA/MDI mixture in accordance with some embodiments.
Figure 10:
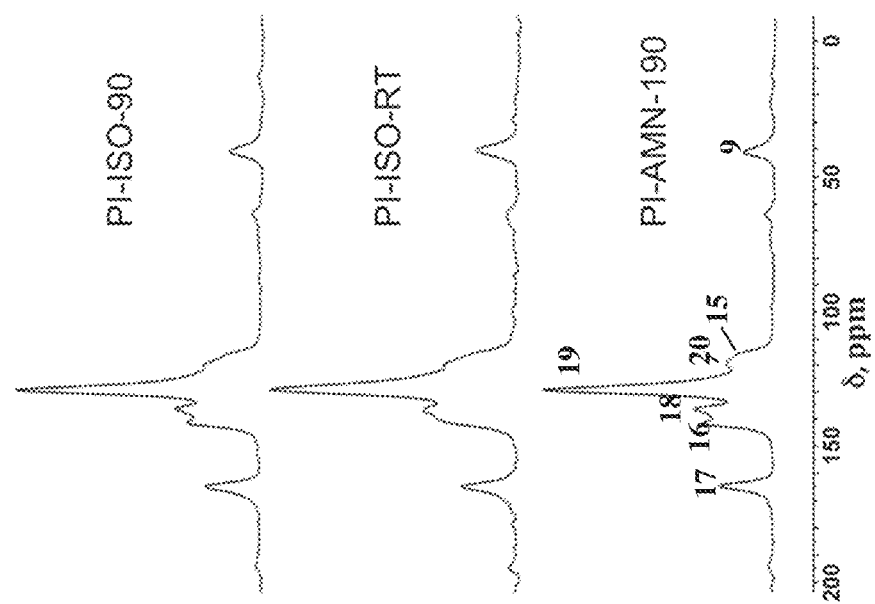
FIG. 10 illustrates a NMR spectra of polyimide aerogels prepared in accordance with some embodiments.

FIG. 10 shows solids CPMAS $^{13}$C-NMR of samples as indicated. Samples shown are prepared using the 15% solids formulation (Table 1) with PI-AMN and PI-ISO-90 prepared in NMP; and PI-ISO-RT prepared in NMP/CH$_3$CN (3:1 w/w). Notably, the peak in the $^{13}$C-NMR spectrum of PI-AMN-190 at 142 ppm (carbon number 16, see FIGS. 5a and 5b) appears only as a shoulder in the spectrum of PI-ISO-RT. According to $^{13}$C-NMR spectra simulations of the PMDA/MDI dimer transition to pentamer, an upfield shift for the resonance of carbon number 16 as the polymer becomes longer is expected, suggesting that PI-ISO-RT consists of longer polymer chains than PI-AMN-190. The $^{13}$C-NMR spectrum of PI-ISO-90, (which was also prepared in NMP just like PI-AMN-190), is identical to the spectrum of the latter, signifying the importance of the solvent polarity in the nucleation and growth mechanism by which the two materials are formed. FIG. 7 shows room temperature (20° C.) liquid $^{13}$C-NMR in DMSO-d$_6$ of a PMDA/MDI mixture (1:1 mol:mol, 12% w/w solids formulation). The bottom two spectra are of the monomers. Times reported refer to the time lapsed after mixing. The last spectrum at the top corresponds to the point just before gelation. FIGS. 5a and 5b show peak assignment (by spectrum simulation).

Experimental Methods

Pyromellitic dianhydride (PMDA) (e.g., obtained from Chriskev Company, Inc.); 4,4'-diisocyanatodiphenylmethane (4,4'-methylene diphenyl diisocyanate, MDI); 4,4'-methylenedianiline (MDA); acetic anhydride ((Ac)$_2$O) (e.g., obtained from Acros Chemicals); and pyridine (e.g., obtained from Fisher Scientific) may be used. Anhydrous N-methyl-2-pyrrolidone (NMP), acetonitrile, dimethylsulfoxide (DMSO), and absolute ethanol were used (e.g., obtained from Aldrich Chemical Co). Deuterated DMSO (DMSO-d$_6$) was also used (e.g., obtained from Cambridge Isotope Laboratories, Inc).

Preparation of polyimide aerogels via the anhydride/diamine route (PI-AMN) will now be described.

Pyromellitic dianhydride (15.696 g, 0.072 mol) and 4,4'-methylenedianiline (14.256 g, 0.072 mol) were added in variable amounts of NMP in a 250-mL round bottom flask under magnetic stirring. For example, for the 15% w/w solids formulation (samples referred to as PI-AMN-15) the amount of NMP was 169.7 g. The solution was stirred at room temperature under nitrogen for 12 h and the color changed from colorless to yellow. At that point, acetic anhydride (in 6.3 mol excess to pyromellitic dianhydride) and pyridine (1:1 mol ratio to acetic anhydride) were added to the resulting polyamic acid solution, and the new solution (sol) was poured into molds and was allowed to gel at room temperature. As molds for samples used for general chemical and physical characterization, Wheaton 4-mL Polypropylene Omni-Vials with a 1.04-cm inner diameter were used (Fisher part No. 225402), and for samples used for mechanical testing 30-mL Fisherbrand Class B Amber Glass Treaded Vials were used, 2.1-cm inner diameter (Fisher part No. 03-339-23E). The gelation time depends on the formulation: for 2.5%, 5%, 10% and 20% w/w solids (PMDA+MDA) in the original NMP solution the gelation time was ~4 h, ~1.5 h, 15 min and <15 min, respectively. The gels were aged in the molds for 12 h; subsequently they were washed with NMP (3×, 8 h each time, using 4× the volume of the gel each time), cured at 190° C. for 3 h in the last NMP wash solution, cooled to room temperature, washed with ethanol (4×, 8 h each time, using 4× the volume of the gel for each wash) and dried into polyimide aerogels in an autoclave with liquid CO$_2$, taken out at the end supercritically.

Preparation of polyimide aerogels via the isocyanate route (PI-ISO) at room temperature and at 90° C. will now be described.

At room temperature, MDI (2.50 g, 0.01 mol) was added under stirring to a mixture of NMP and acetonitrile (3:1 w/w), or NMP and DMSO (1:1 w/w) in a three-neck round bottom flask under N$_2$ at room temperature. Once the isocyanate was dissolved, pyromellitic dianhydride (2.18 g, 0.01 mol) was added. For example, for a 15% w/w solids formulation the amount of NMP and acetonitrile were 19.88 g (19.34 mL) and 6.62 g (8.43 mL), respectively. Similarly for a 10% w/w solids formulation, the amounts of NMP and DMSO were 21.06 g and 21.06 g respectively. The reaction mixture was stirred under nitrogen for 1 h. The resulting sol was poured in molds (see above), which were allowed to stand at room temperature. Gelation takes usually 6 h-48 h depending on the formulation. For example, in NMP: CH$_3$CN (3:1 w/w), the 10%, 15%, 20% and 30% w/w solids formulations take 2 days, 36 h, 18 h, and 12 h, respectively. By comparison, a 15% w/w solids formulation in NMP takes 48 h for gelation at RT. Gels were aged in the molds for 24 h-8 days depending on the gelation time, typically four times the gelation time. Subsequently, gels were removed from the molds and were initially washed (solvent-exchanged) with NMP:acetonitrile (3:1 v/v), then with NMP:acetonitrile: acetone (2:1:1 v/v/v), NMP:acetone (1:1 v/v), and finally with pure acetone. Similarly, gels synthesized in NMP/DMSO were placed in pure NMP, the second wash was carried out with NMP:acetone (3:1 v/v) the third with NMP:acetone (1:1 v/v), and finally gels were placed in pure acetone. After 4 acetone washes (8 h each time, using 4× the volume of the gel for each wash) wet gels were dried into polyimide aerogels in an autoclave with liquid CO$_2$, taken out at the end supercritically.

At 90° C., a more time-efficient synthesis of PI-ISO was carried out at slightly (by polyimide standards) elevated temperatures as follows: pyromellitic dianhydride (2.18 g, 0.01 mol) and MDI (2.50 g, 0.01 mol) were added in variable amounts of NMP in a three-neck round bottom flask under nitrogen at room temperature. For example, for a 15% w/w solids formulation the amount of NMP was 26.52 g. The flask was placed in a 60° C. bath and the solution was stirred under N$_2$ for 0.5 h. The resulting sol was poured into molds (see above), which were heated in an oven successively at 60° C., 70° C., and 80° C. for 3 h at each temperature. Although gelation of the PMDA/MDI/NMP mixture may occur even at room temperature over longer periods of time as described above, according to this protocol, gelation usually occurs at the early stages of the 60° C. heating. Gels were first aged at 90° C. for 12 h in their molds, and subsequently they were removed from the molds and placed directly in fresh ethanol. After four ethanol washes (8 h each time, using 4× the volume of the gel for each wash) wet gels were dried into polyimide aerogels in an autoclave with liquid CO$_2$, taken out at the end supercritically.

Conversion of polyimide aerogels into carbon aerogels will also be described.

PI-AMN and PI-ISO aerogels were pyrolyzed at 800° C. for 3 h in a tube furnace under a flowing stream of Ar. Before heating, the tube was purged with Ar for 10 min, and the heating rate was set at 5° C. min$^{-1}$. At the end of the heating period, the power to the furnace was disconnected and the tube was allowed to cool slowly back to room temperature under flowing Ar.

Carbon aerogels were etched by placing the aerogels in a tube furnace under flowing argon and were heated at 1000° C. The flowing gas was switched to $CO_2$ and the temperature was maintained at that level for 3 h. Subsequently the flowing gas was switched back to Ar and the power to the furnace was disconnected, allowing for slow cooling back to room temperature.

Drying with supercritical fluid $CO_2$ was conducted in an autoclave (SPI-DRY Jumbo Supercritical Point Dryer, SPI Supplies, Inc. West Chester, Pa.). Aerogel bulk densities ($\rho_b$) were calculated from the weight and physical dimension of the samples. Skeletal densities ($\rho_s$) were determined with helium pycnometry using a Micromeritics AccuPyc II 1340 instrument. Porosities, Π, were determined from $\rho_b$ and $\rho_s$ according to: $\Pi=100\times[(1/\rho_b)-(1/\rho_s)]/(1/\rho_b)$. BET surface areas (σ) and pore size distributions were measured with nitrogen adsorption/desorption porosimetry using a Micromeritics ASAP 2020 Surface Area and Porosity Analyzer. Samples for surface area and skeletal density determination were outgassed for 24 h at 80° C. under vacuum before analysis. Average pore diameters were determined by the $4\times V_{Total}/\sigma$ method, where $V_{Total}$ is the total pore volume per gram of sample. $V_{Total}$ is calculated either from the single highest volume of $N_2$ adsorbed along the adsorption isotherm or from the relationship $V_{Total}=(1/\rho_b)-(1/\rho_s)$. The single point $N_2$ adsorption method tends to underestimate $V_{Total}$ significantly when macropores are involved, and thus numerical proximity of the values determined by the two methods is used as a semi-quantitative criterion for evaluating macroporosity. Scanning electron microscopy (SEM) was conducted using a Hitachi S-4700 Field Emission instrument. Chemical characterization of all polyimide aerogels was based on IR and solid state $^{13}C$ NMR. Infrared spectra were obtained in KBr pellets using a Nicolet-FTIR model 750 Spectrometer. Solid-state $^{13}C$ NMR spectra were obtained with samples ground in fine powders on a Bruker Avance 300 spectrometer (75.475 MHz carbon frequency), using magic angle spinning (5 kHz) with broadband proton suppression and the CPMAS TOSS pulse sequence for spin sideband suppression. $^{13}C$ NMR spectra were externally referenced to the carbonyl of glycine (176.03 ppm relative to tetramethylsilane). $^{13}C$-NMR peak assignment was aided by NMR spectra simulations using ChemDraw Ultra 7.0. Thermogravimetric analysis (TGA) was conducted under nitrogen with a TA Instrument, model Hi-Res-TGA 2950 using ~10 mg samples and a heating rate of 10° C. min$^{-1}$. The reaction between PMDA and MDI was monitored in DMSO-d$_6$ at room temperature up to the gelation point by liquid $^{13}C$ NMR using a 400 MHz Varian Unity Inova NMR instrument. The crystallinity of the polyimide samples was determined by x-ray diffraction (XRD) using a Scintag 2000 diffractometer with Cu Kα radiation and a proportional counter detector equipped with a flat graphite monochromator. The identity of the fundamental building blocks of the two materials was probed with small angle neutron scattering (SANS) using ~2 mm thick discs cut with a diamond saw from cylinders, on a time-of-flight, low-Q diffractometer, LQD, at the Manuel Lujan Jr. Scattering Center of the Los Alamos National Laboratory. The scattering data are reported in the absolute units of differential cross section per unit volume (cm$^{-1}$) as a function of Q, the momentum transferred during a scattering event. Quasi-static mechanical testing under compression was conducted on an Instron 4469 universal testing machine frame, following the testing procedures and specimen length/diameter ratio (equal to one) in ASTM D1621-04a (Standard Test Method for Compressive Properties of Rigid Cellular Plastics). The recorded force as a function of displacement (machine-compliance corrected) was converted into stress as a function of strain. Four-point-probe conductivity measurements were conducted on flat surface of rectangular block of carbon aerogel samples (made with a fine sand paper) using an Alesis contact probe station model CPS-06 with a Cascade Microtech electrode model C4S-44/5S. The reliability of the probe was confirmed with silicon wafers and indium-tin-oxide coated glass slides of known sheet resistance.

Macroscopic Characterization of PI-ISO Versus PI-AMN

Figures 2A, 2B:
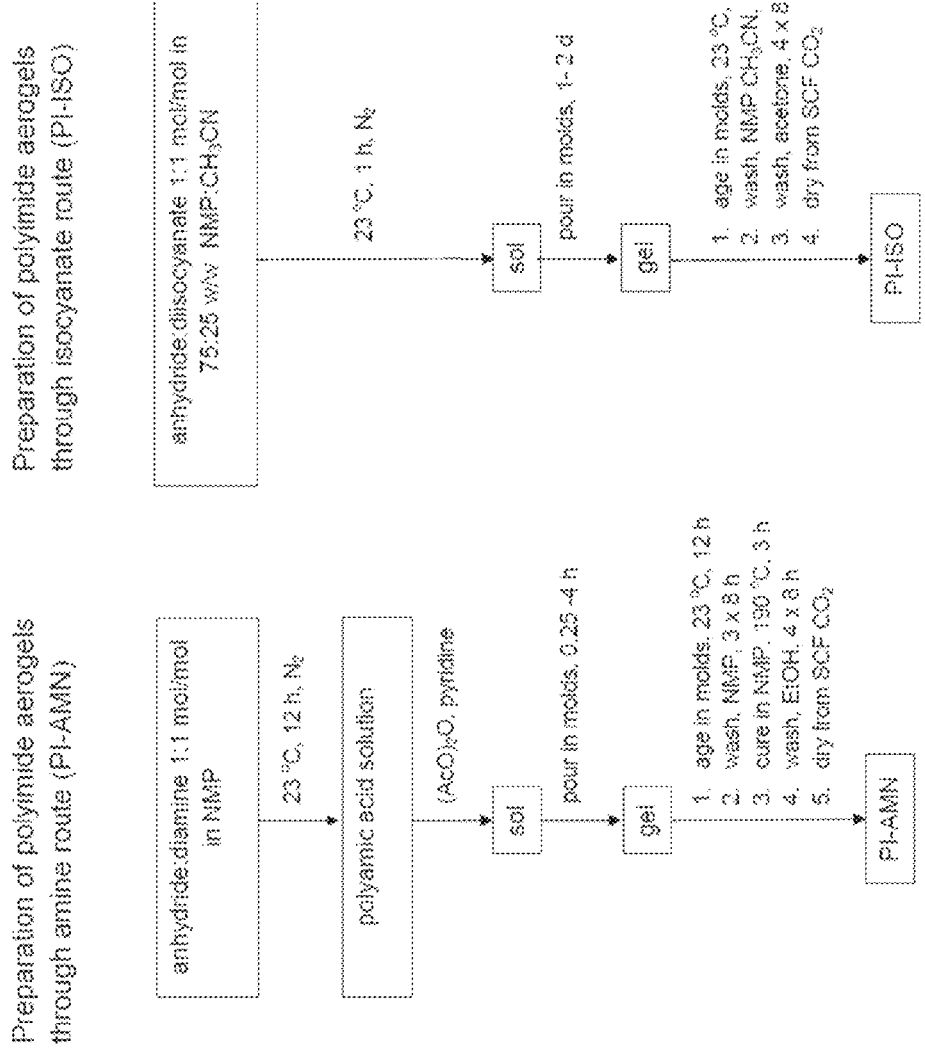
FIG. 2a shows a flow chart for the preparation of a three-dimensional porous polyimide network in accordance with some embodiments.
FIG. 2b shows another flow chart for the preparation of a three-dimensional porous polyimide network in accordance with some embodiments.
Figure 3A:
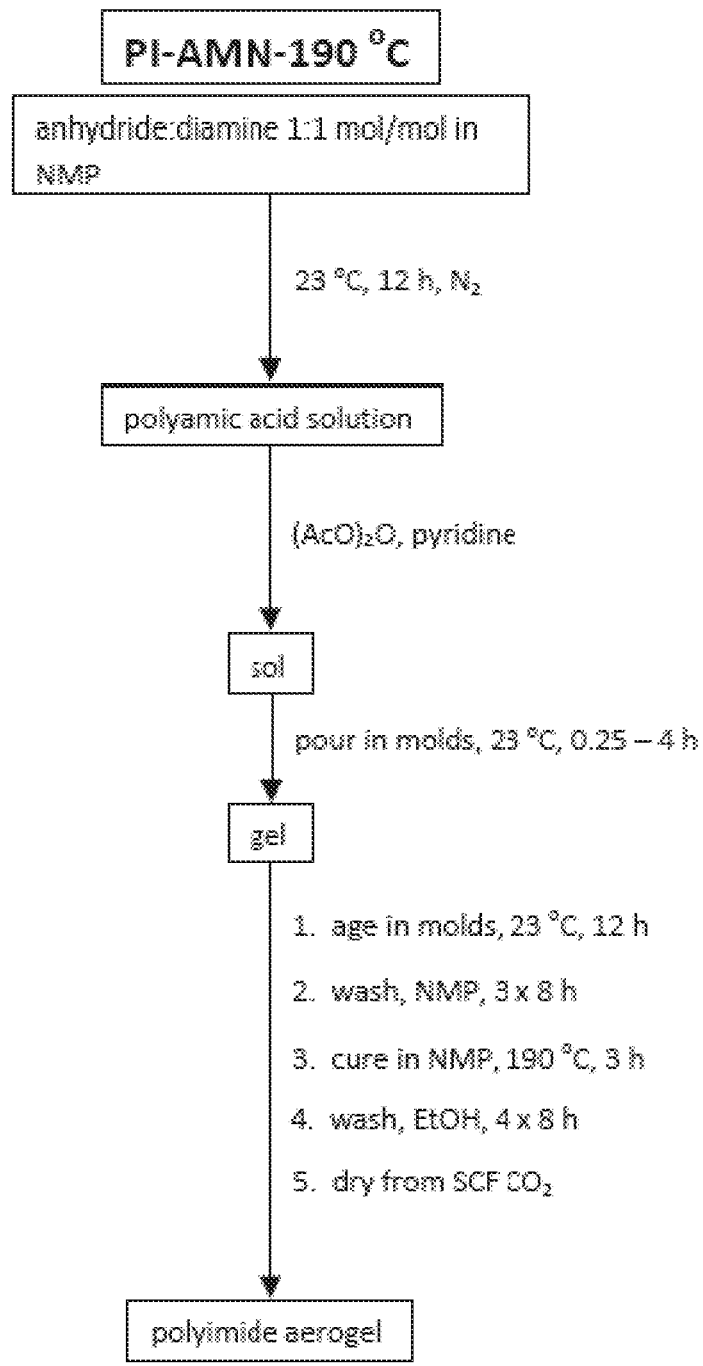
FIG. 3a depicts a flow chart for the preparation of a three-dimensional porous polyimide network in accordance with some embodiments.
Figure 3B:
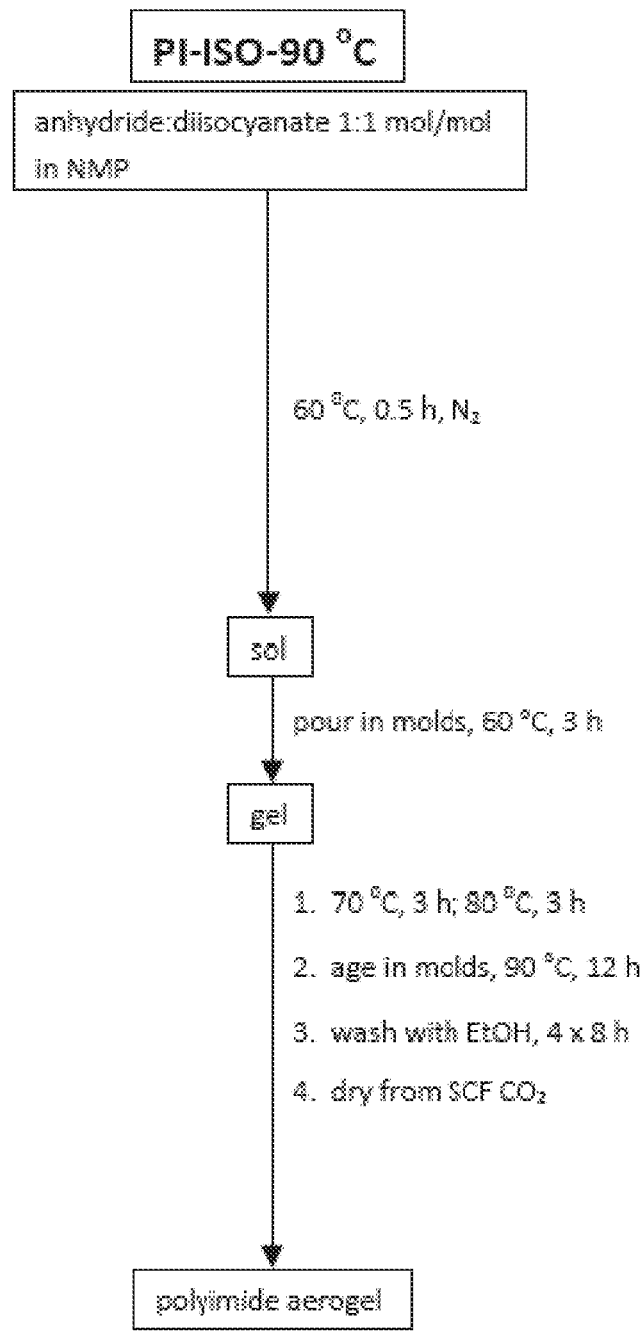
FIG. 3b shows another flow chart for the preparation of a three-dimensional porous polyimide network in accordance with some embodiments.
Figure 3C:
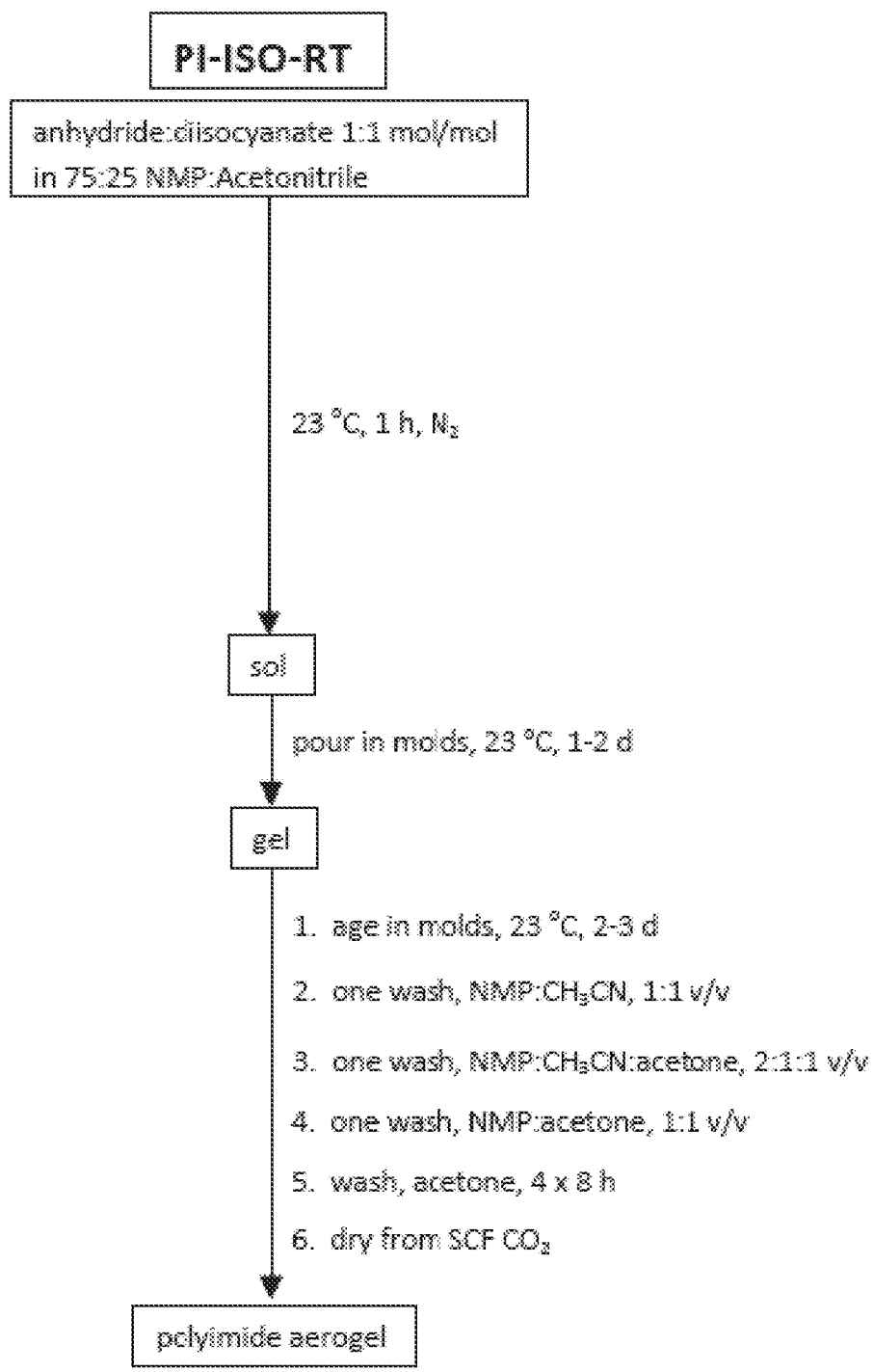
FIG. 3c shows yet another flow chart for the preparation of a three-dimensional porous polyimide network in accordance with some embodiments.
Figure 8:
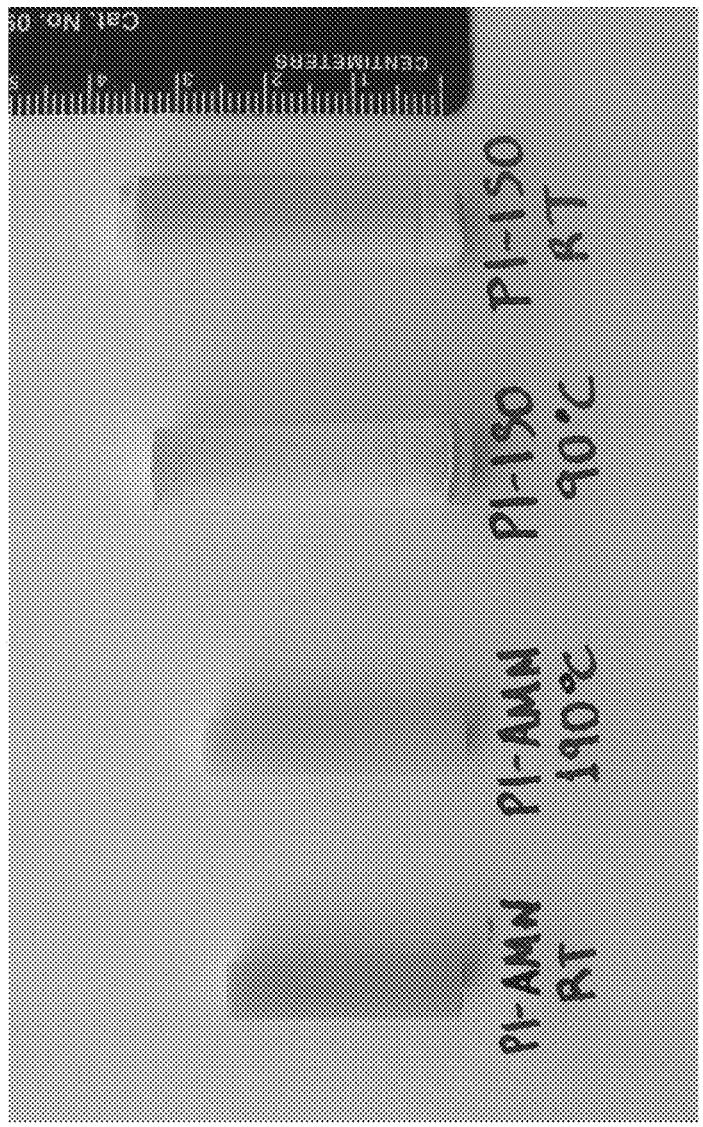
FIG. 8 illustrates photographs of polyimide aerogels synthesized in accordance with some embodiments.
Figure 11:
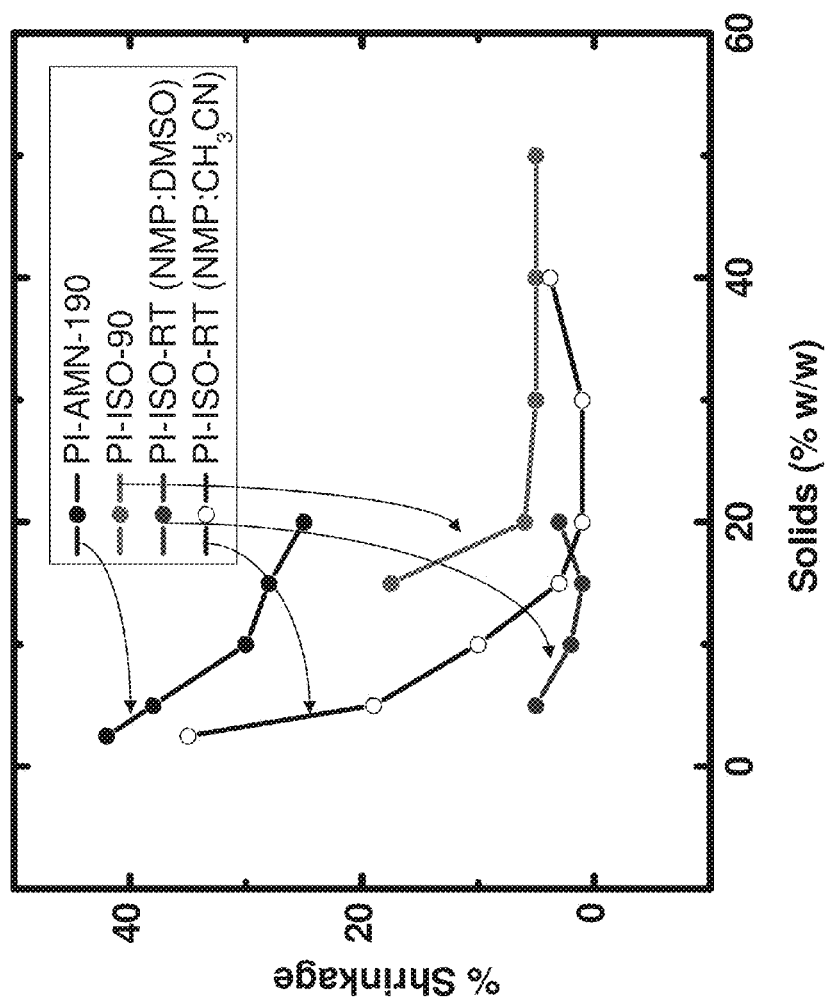
FIG. 11 depicts a shrinkage data for polyimide aerogels prepared in accordance with some embodiments.

General materials properties of polyimide aerogels synthesized by methods shown in FIGS. 2a and 2b are summarized in Table 1. FIG. 8 shows photographs of polyimide aerogels synthesized with 15% solids under various conditions also summarized in Table 1. Despite that sols are formulated based on weight percent of solids in solvents of different densities, attention was paid so that the molar monomer concentrations in the different sols, ([C], see Table 1), remained about equal, allowing for a direct comparison. PI-AMN aerogels appear mechanically stronger than the corresponding PI-ISO, but as mentioned above they also shrink significantly with respect to their molds (from 42% at the lowest gelation limit of 2.5% w/w solids, to 25% at the maximum solubility limit of 20% w/w solids). On the other hand, PI-ISO samples are also robust but soft, and shrink significantly less than PI-AMN under any preparation conditions—in some cases even less than 1%. Shrinkage is reflected upon the bulk densities ($\rho_b$) of the final aerogels. FIG. 11 summarizes data for shrinkage in a linear dimension (e.g., the cylinder diameter) of samples of Table 1. PI-AMN samples shrink much more than PI-ISO prepared using similar monomer concentrations (see Table 1). At similar solids concentration formulations, the density of the PI-ISO samples is lower than that of the PI-AMN samples (e.g., at 20% w/w solids formulation, which is the highest solubility recorded of PI-AMN, the density of the PI-ISO samples is 0.2 g cm$^{-3}$ versus 0.3 g cm$^{-3}$ for the PI-AMN samples). Further, the lowest $\rho_b$ values with PI-AMN attainable are ~0.09 g cm$^{-3}$, while easy-to-handle PI-ISO monoliths with $\rho_b$ as low as 0.05 g cm$^{-3}$ are readily prepared.

TABLE 1

Materials characterization data for polyimide aerogels

| Same Name (Composition-Process-Temperature-% w/w Solids)[a] | [C], M | Linear Shrinkage (%)[e] | Bulk Density, $\rho_b$ (g cm$^{-3}$) | Skeletal Density, $\rho_s$ (g cm$^{-3}$)[g] | Crystallinity (%) [°2θ] |
|---|---|---|---|---|---|
| PI-AMN-190-2.5[d] | 5.78 × 10$^{-5}$ | 41.6 | 0.090 | 1.547 ± 0.104 | 45 [21, 29] |
| PI-ISO-RT-2.5[c,d] | 5.14 × 10$^{-5}$ | 35.3 | f | 1.595 ± 0.102 | f |
| PI-AMN-190-5 | 1.17 × 10$^{-4}$ | 38.0 ± 0.1[j] | 0.142 ± 0.021[j] | 1.478 ± 0.045 | 37 [21, 28] |
| PI-ISO-RT-5[b] | 1.18 × 10$^{-4}$ | 5.0 | f | 1.526 ± 0.045 | 42 [19, 25] |

TABLE 1-continued

Materials characterization data for polyimide aerogels

| Sample | | | | | |
|---|---|---|---|---|---|
| PI-ISO-RT-5[c] | 1.04 × 10[−4] | 18.87 ± 0.02[j] | 0.047 ± 0.002[j] | 1.534 ± 0.080 | 37 [18] |
| PI-AMN-190-10 | 2.37 × 10[−4] | 30.04 ± 0.02[k] | 0.186 ± 0.016[k] | 1.453 ± 0.015 | 41 [21, 29, 42] |
| PI-ISO-RT-10[b,k] | 2.33 × 10[−4] | 2.1 ± 0.9[k] | 0.112 ± 0.003[k] | 1.490 ± 0.023 | 23 [18] |
| PI-ISO-RT-10[c,k] | 2.11 × 10[−4] | 10.03 ± 0.03[k] | 0.090 ± 0.006[k] | 1.473 ± 0.022 | 59 [43, 49] |
| PI-AMN-190-15 | 3.61 × 10[−4] | 28.24 ± 0.01[k] | 0.232 ± 0.008[k] | 1.474 ± 0.024 | 35 [22, 26] |
| PI-AMN-RT-15 | 3.61 × 10[−4] | 35.0 ± 0.3[k] | 0.376 ± 0.006[k] | 1.432 ± 0.018 | 37 [35, 48] |
| PI-ISO-90-15 | 3.43 × 10[−4] | 17.48 ± 0.02[k] | 0.223 ± 0.014[k] | 1.551 ± 0.037 | 33 [22, 27, 44] |
| PI-ISO-RT-15[b] | 3.54 × 10[−4] | <1.0[k] | 0.167 ± 0.002[k] | 1.447 ± 0.021 | 17 [17] |
| PI-ISO-RT-15[c] | 3.22 × 10[−4] | 3.19 ± 0.01[k] | 0.124 ± 0.001[k] | 1.398 ± 0.009 | 42 [43, 49] |
| PI-AMN-190-20 | 4.89 × 10[−4] | 24.89 ± 0.02[k] | 0.291 ± 0.022[k] | 1.437 ± 0.016 | 31 [21, 29] |
| PI-ISO-90-20 | 4.64 × 10[−4] | 5.87 ± 0.01[k] | 0.266 ± 0.011[k] | 1.454 ± 0.009 | 33 [18] |
| PI-ISO-RT-20[b] | 4.77 × 10[−4] | 2.78 ± 0.03[k] | 0.208 ± 0.001[k] | 1.415 ± 0.022 | 22 [18] |
| PI-ISO-RT-20[c] | 4.36 × 10[−4] | 1.27 ± 0.01[k] | 0.196 ± 0.001[k] | 1.461 ± 0.014 | 31 [17, 19] |
| PI-ISO-90-30 | 7.17 × 10[−4] | 4.71 ± 0.001[l] | 0.382 ± 0.003[l] | 1.473 ± 0.031 | 31 [17] |
| PI-ISO-RT-30[c] | 6.78 × 10[−4] | <1.0[l] | 0.285 ± 0.027[l] | 1.445 ± 0.009 | 33 [17, 20] |
| PI-ISO-90-40 | 9.84 × 10[−4] | 4.90 ± 0.001[l] | 0.513 ± 0.011[l] | 1.432 ± 0.009 | 32 [17, 19] |
| PI-ISO-RT-40[c] | 9.36 × 10[−4] | 3.8 ± 0.2[l] | 0.417 ± 0.008[l] | 1.443 ± 0.007 | 42 [27, 43] |
| PI-ISO-90-50 | 1.27 × 10[−3] | 5.50 ± 0.00₃[l] | 0.679 ± 0.002[l] | 1.452 ± 0.014 | 33 [19, 25] |

| Same Name (Composition-Process-Temperature-% w/w Solids)[a] | Porosity, Π (% void space) | BET Surface Area, σ(m² g⁻¹) | Average Pore Diameter (nm)[h] | Average Pore Diameter (nm)[i] |
|---|---|---|---|---|
| PI-AMN-190-2.5[d] | 94 | 385 | 17.0 [108.5] | 42.7 [60.4] |
| PI-ISO-RT-2.5[c,d] | f | 297 | 14.7 [f] | 35.5 [55.0] |
| PI-AMN-190-5 | 90 | 412 | 29.6 [62.0] | 47.0 [11.4] |
| PI-ISO-RT-5[b] | f | 374 | 13.8 [f] | 36.3 [67.3] |
| PI-ISO-RT-5[c] | 97 | 333 | 23.0 [250.4] | 36.3 [45.7] |
| PI-AMN-190-10 | 87 | 431 | 29.5 [45.8] | 40.7 [22.1] |
| PI-ISO-RT-10[b,k] | 93 | 373 | 28.9 [88.9] | 41.7 [37.1] |
| PI-ISO-RT-10[c,k] | 94 | 316 | 25.6 [131.6] | 39.8 [38.4] |
| PI-AMN-190-15 | 84 | 413 | 26.5 [35.3] | 31.6 [17.1] |
| PI-AMN-RT-15 | 74 | 299 | 11.2 [26.2] | 14.5 [9.4] |
| PI-ISO-90-15 | 85 | 244 | 14.2 [62.6] | 39.8 [66.6] |
| PI-ISO-RT-15[b] | 88 | 391 | 25.5 [54.3] | 31.6 [28.4] |
| PI-ISO-RT-15[c] | 91 | 315 | 33.5 [93.2] | 52.5 [34.3] |
| PI-AMN-190-20 | 80 | 378 | 18.2 [29.0] | 24.0 [11.9] |
| PI-ISO-90-20 | 80 | 246 | 20.0 [50.0] | 24.0 [11.8] |
| PI-ISO-RT-20[b] | 85 | 366 | 23.0 [44.7] | 30.9 [30.8] |
| PI-ISO-RT-20[c] | 87 | 352 | 22.7 [84.7] | 39.8 [26.1] |
| PI-ISO-90-3 | 74 | 303 | 13.2 [51.2] | 24.5 [30.0] |
| PI-ISO-RT-30[c] | 80 | 339 | 22.4 [33.3] | 40.7 [32.2] |
| PI-ISO-90-40 | 64 | 278 | 10.7 [17.8] | 14.1 [25.6] |
| PI-ISO-RT-40[c] | 71 | 171 | 12.0 [39.7] | 39.8 [40.2] |
| PI-ISO-90-50 | 53 | 222 | 6.3 [14.1] | 8.5 [7.2] |

[a]PI-AMN: Polyimide samples synthesized through the amine route; PI-ISO: polyimide samples synthesized through the isocyanate route; PI-AMN-190: samples cured in NMP at 190° C. before drying; PI-AMN-RT: samples dried supercritically without further curing at 190° C.; PI-ISO-90: samples synthesized at 60-90° C. in NMP; PI-ISO-RT: samples synthesized at room temperature.
[b]PI-ISO-RT samples synthesized in NMP/DMSO.
[c]PI-ISO-RT samples synthesized in NMP/acetonitrile).
[d]Single sample.
[e]Shrinkage = 100 × (mold diameter − sample diameter)/(mold diameter).
f. Irregular shape, was not measured.
[g]Single sample, average of 50 measurements.
[h]By the 4 × $V_{Total}/\sigma$ method. For the first number, $V_{Total}$ was calculated by the single-point adsorption method; for the number in brackets, $V_{Total}$ was calculated via $V_{Total} = (1/\rho_b) - (1/\rho_s)$.
[i]From the BJH plots: The first numbers are the peak maxima; the numbers in brackets are the width at half maxima of the BJH plots.
[j]Average of 2 samples.
[k]Average of 4 samples.
[l]Average of 3 samples.

Figure 12:
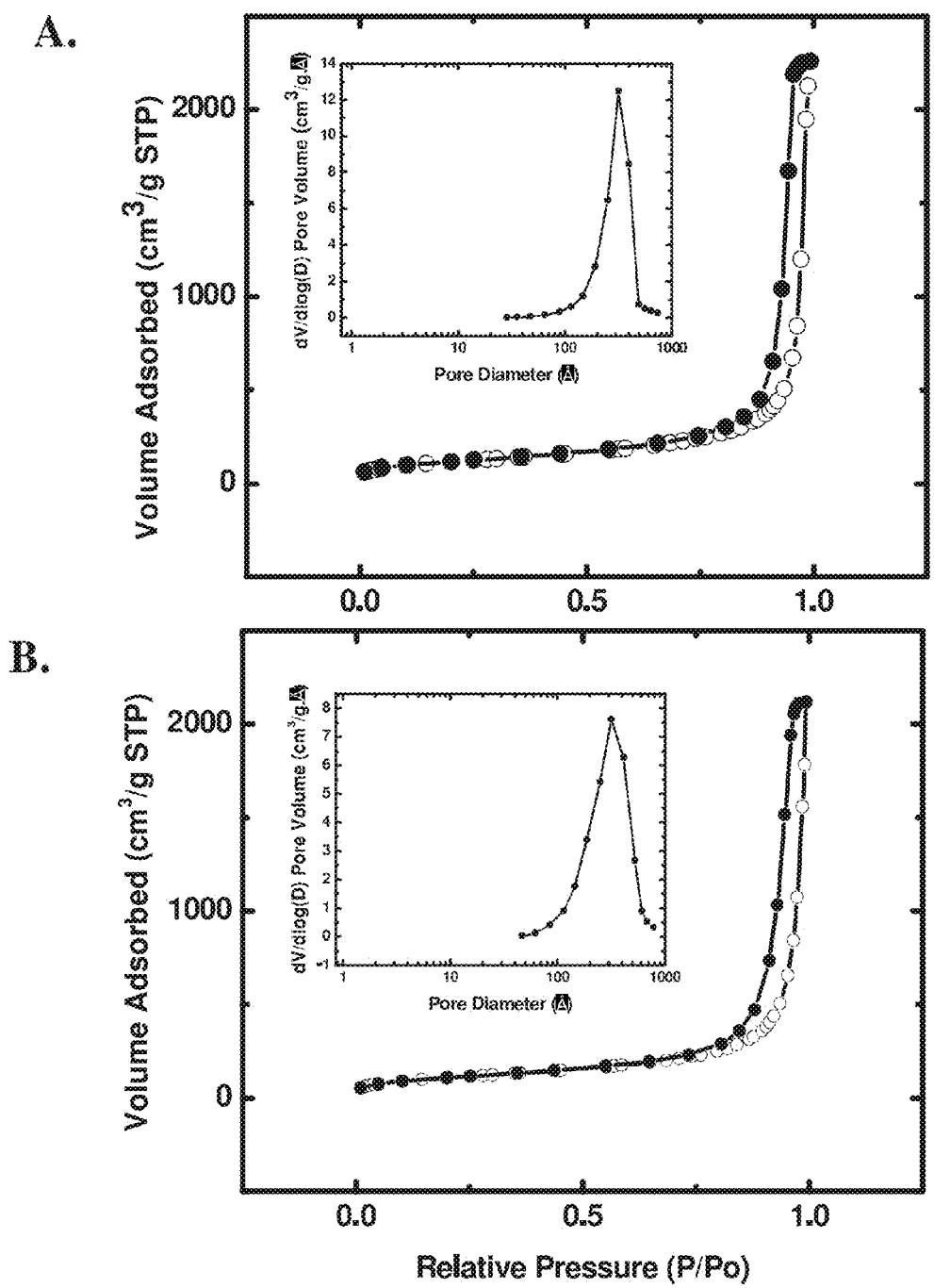
FIG. 12 shows nitrogen sorption data for polyimide aerogels prepared in accordance with some embodiments.

Partly owing to the similar chemical composition of the two materials, partly to their similar degree of crystallinity (30-45% by XRD, see Table 1), and partly to similar packing distances within the crystalline phases (expressed by similar 2θ values, see Table 1), skeletal densities, $\rho_s$, of all samples are in the 1.4-1.5 g cm⁻³ range, which is comparable with the density of bulk polyimides obtained from PMDA and MDA (1.357 g cm⁻³). The similar $\rho_s$ values but the different $\rho_b$'s are reflected in the porosities, which are higher for the PI-ISO aerogels relative to the corresponding PI-AMN samples. However, BET surface areas, σ, from N₂-sorption data show an opposite trend from the porosities: despite higher shrinkage, higher bulk densities and lower porosities, PI-AMN samples have about equal or higher surface areas than PI-ISO samples. These data point to significant differences in the nanomorphology of the PI-AMN versus the PI-ISO samples, which are discussed in the next section. FIG. 12 shows representative N₂-sorption data (insets showing BJH plots) of polyimide aerogels prepared using the 15% w/w solids formulations (Table 1). FIG. 12(A) depicts PI-AMN-190 ($\rho_b$=0.23 g cm⁻³); and FIG. 12(B) shows PI-ISO-RT prepared in NMP/DMSO 1:1 w/w ($\rho_b$=0.17 g cm⁻³).

Structural Characterization of PI-ISO Versus PI-AMN

The microstructure of polyimide aerogels was evaluated in terms of their pore-size distribution and the nanomorphology of their skeletal frameworks. The pore-size distribution at the meso/macro scale was evaluated semi-quantitatively by analysis of the $N_2$-sorption data in combination with SEM, while the elementary building blocks of the skeletal framework were probed with SANS. Data shown concern samples obtained with the 15% w/w solids formulation. Similar data and trends have been observed with samples prepared with all other solids formulations (Table 1).

Figure 13:
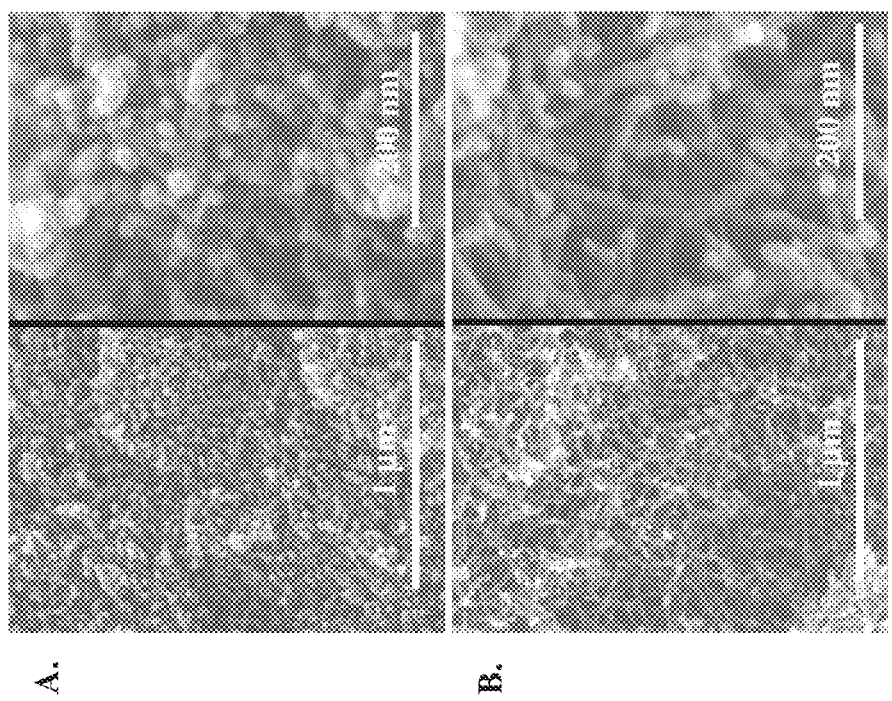
FIG. 13 shows scanning electron microscope (SEM) images of polyimide aerogels prepared in accordance with some embodiments.
Figure 14:
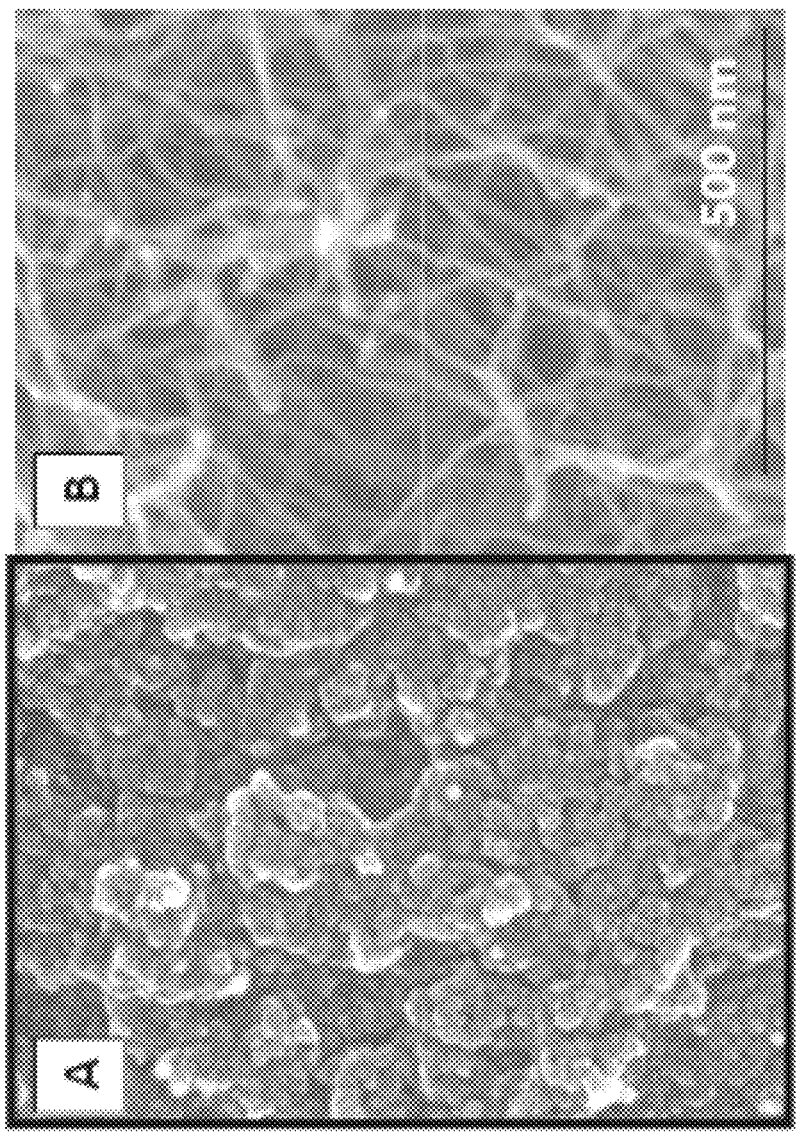
FIG. 14 shows more SEM images of polyimide aerogels prepared in accordance with some embodiments.

For both PI-AMN and PI-ISO samples, $N_2$-sorption isotherms show a rapid increase of the volume adsorbed at relative pressures above 0.9, which in combination with the narrow desorption loop indicates the presence of both meso- and macroporosity. Indeed, pore size analysis via the relationship (pore diameter)=$4 \times V_{Total}/\sigma$, where $V_{Total}$ is calculated either from the maximum adsorption point in the isotherm, or the relationship $V_{Total}=(1/\rho_b)-(1/\rho_s)$, gives quite different values (Table 1), which get progressively closer as the bulk density increases, as expected by the fact that more dense materials should have smaller pores. The BJH-desorption method reflects the mesoporosity and yields pore diameters closer to those obtained by the single point absorption method (Table 1), but it also shows quite broad pore size distributions (evaluated by the width at half maxima of the BJH plots, see Table 1). Overall, the $N_2$-sorption method indicates that both PI-AMN and PI-ISO aerogels are meso/macroporous materials. SEM, however, shows that their pore structures are quite different: at all densities PI-AMN are particulate while PI-ISO are fibrous. At high magnifications, there was a discernible primary/secondary particle structural hierarchy in the case of PI-AMN, while in some cases it can be also claimed that the PI-ISO ribbons consist of particles. FIG. 13 illustrates SEM data at two different magnifications of polyimide aerogels prepared using the 15% w/w solids formulations (Table 1). FIG. 13(A) shows PI-AMN-190 ($\rho_b$=0.23 g cm$^{-3}$); and FIG. 13(B) shows PI-ISO-RT prepared in NMP/CH$_3$CN 3:1 w/w ($\rho_b$=0.12 g cm$^{-3}$). FIG. 14 shows SEM data of (A) PI-AMN ($\rho_b$=0.186 g/cm$^3$, porosity=87%, $\rho_s$=1.456 g/cm$^3$, BET surface area=431 m$^2$/g); and (B) PI-ISO ($\rho_b$=0.090 g/cm$^3$, porosity=94%, $\rho_s$=1.473 g/cm$^3$, BET surface area=315 m$^2$/g).

Figure 15:
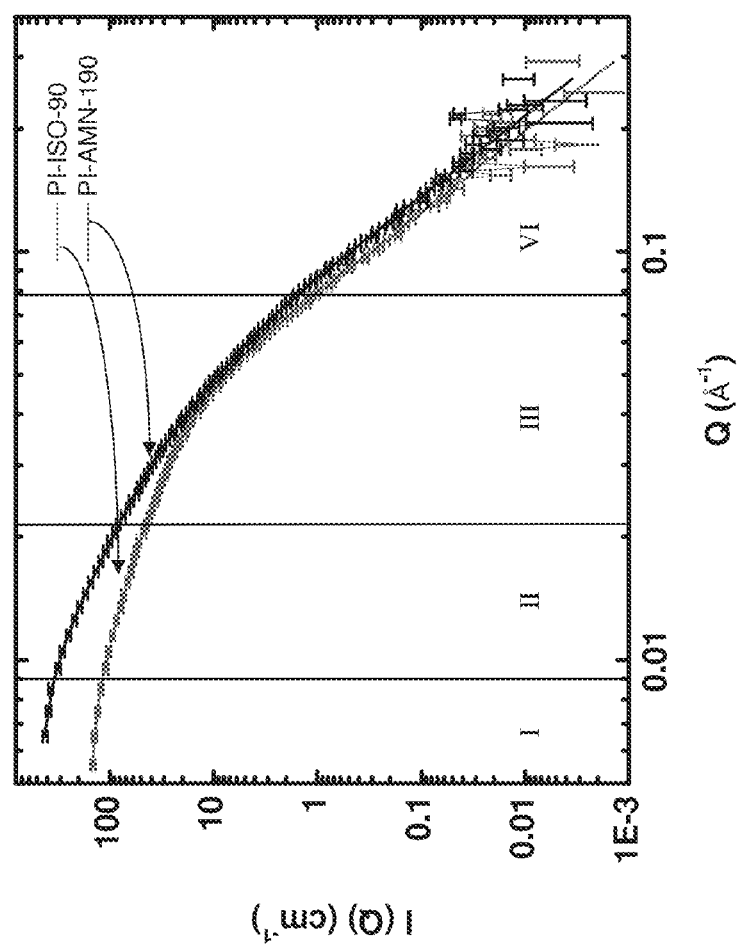
FIG. 15 depicts small angle neutron scattering data of polyimide aerogels prepared in accordance with some embodiments.

The make-up of the skeletal frameworks in PI-AMN and PI-ISO was probed quantitatively with SANS. To exclude the effect of the solvent, which controls phase-separation, and therefore affects the size of the particles, the specific materials compared were both prepared in NMP (PI-ISO-90 and PI-AMN-190). While scattering from PI-AMN and PI-ISO is distinct, there are similarities. To facilitate analysis, and as shown in FIG. 15, scattering has been broken down into four regions. Each material displays two length-scales (regions I and III) and two power-law regions (linear sections on a log-log plot, regions II and IV). In region IV both materials display power-law scattering with exponents of ~5 (PI-ISO: 5.0±0.1; PI-AMN: 5.1±0.1). FIG. 15 shows SANS data of PI-AMN-190 (black line, $\rho_b$=0.23 g cm$^{-3}$) and of PI-ISO-90 (red line, $\rho_b$=0.22 g cm$^{-3}$) both prepared in NMP using the 15% w/w solids formulation. Vertical lines separate the power-law regions (II and IV) from the "knee" regions (I and III). For smooth interfaces, the exponent in this region is typically 4, while for fractally-rough interfaces it is 3-4. Exponents >4 are largely attributed to rapidly changing density at the interface. In region III, both materials display a "knee," which is indicative of a fundamental length-scale and may relate to small pores, the cross section of a foam strut, or the primary particle size of aggregates forming the material. The first two possibilities are excluded based on the similar skeletal densities of the two materials (absence of small pores) and the quite different SEM microstructures (different cross-sections of the skeletal frameworks). Region III knees are attributed to the primary particles forming the materials. Analysis according to the Unified Model provides the radius of gyration ($R_g$), where for spherical particles $R_g \approx 0.77R$ (R is the average radius of the particles). For PI-AMN, $R_g$=5.8 nm and for PI-ISO, $R_g$=4.7 nm. In region II, both materials exhibit power-law scattering again. PI-AMN exhibits a power-law with an exponent of ~2 and PI-ISO exhibits an exponent of ~1. For fractal systems, an exponent of 2 would indicate pore (or mass) fractals, while for simple shapes it is indicative of a sheet- or disk-like morphology; an exponent of 1 is indicative of a cylindrical-like morphology, which would describe the fibers of PI-ISO. Finally, in region I both materials display "knees," which may again relate to larger pores, the cross section of a foam strut or the size of an aggregate of particles. For PI-AMN, $R_g$=35 nm and for PI-ISO, $R_g$=41.6 nm. Based on SEM, in the case of PI-AMN those structural elements are attributed to secondary particles and in the case of PI-ISO to the diameter of the fibers. It is noted that length-scales identified by SANS agree well with feature sizes seen at the higher magnification SEM.

Figure 6B:
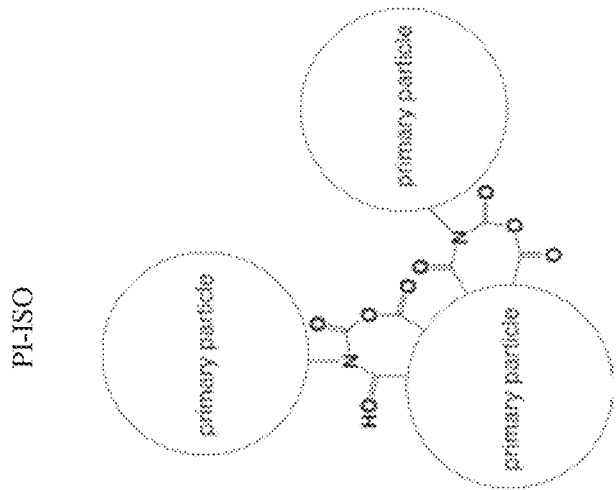
FIG. 6b illustrates a molecular structure of a three-dimensional porous polyimide network formed through an isocyanate route in accordance with some embodiments.
Figure 6A:
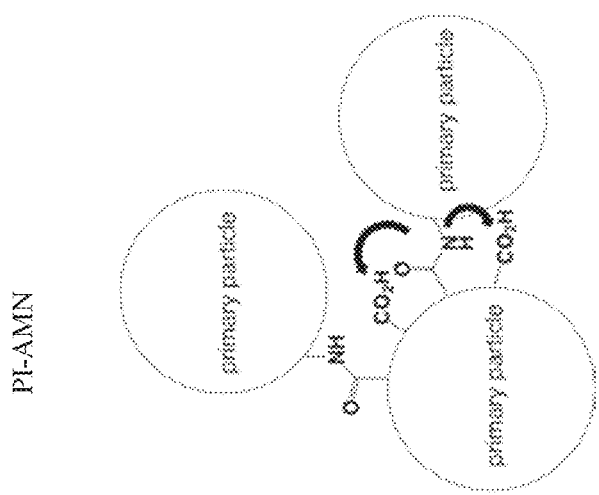
FIG. 6a depicts a molecular structure of a three-dimensional porous polyimide network formed through an amine route.

Overall, chemically identical (case of PI-AMN-190 and PI-ISO-90) and structurally very similar primary particles (in terms of crystallinity and size) seem to form secondary particles in the case of PI-AMN, and fibers in the case of PI-ISO. The size of the primary particles may be controlled by the common solvent (NMP). Then, the variable that remains different in the two systems is the actual chemistry of the two processes, which is translated into the surface functionality of the primary particles. It is suggested that the flexible amic acid bridges between PI-AMN primary particles allows pivoting, closer packing, and a 3D growth resulting into secondary particles; on the other hand, the rigidity of the seven-member ring between PI-ISO primary particles, in combination with steric hindrance from neighboring particles, imposes growth at the exposed ends of the assembly resulting in directional growth and fibers. FIGS. 6a and 6b illustrate a molecular schematic of the interfacial chemistry of primary particles in PI-AMN and PI-ISO.

The 3D growth in PI-AMN creates numerous crosslinks between secondary particles while in the case of PI-ISO, crosslinking may take place only at the contacts between fibers. This model for PI-AMN versus PI-ISO aerogels is supported by the higher shrinkage of PI-AMN, and may serve as an explanation for their high compressive mechanical strength, which compares favorably with that of structurally analogous polymer crosslinked silica aerogels at the same densities. On the other hand, at similar percent solids formulations, PI-ISO aerogel monoliths are mechanically much weaker materials, undergoing premature catastrophic failure to large pieces with much smaller loads. In some embodiments, entangled nanofibrous structures are generally mechanically stronger (the bird-nest effect).

Figure 16:
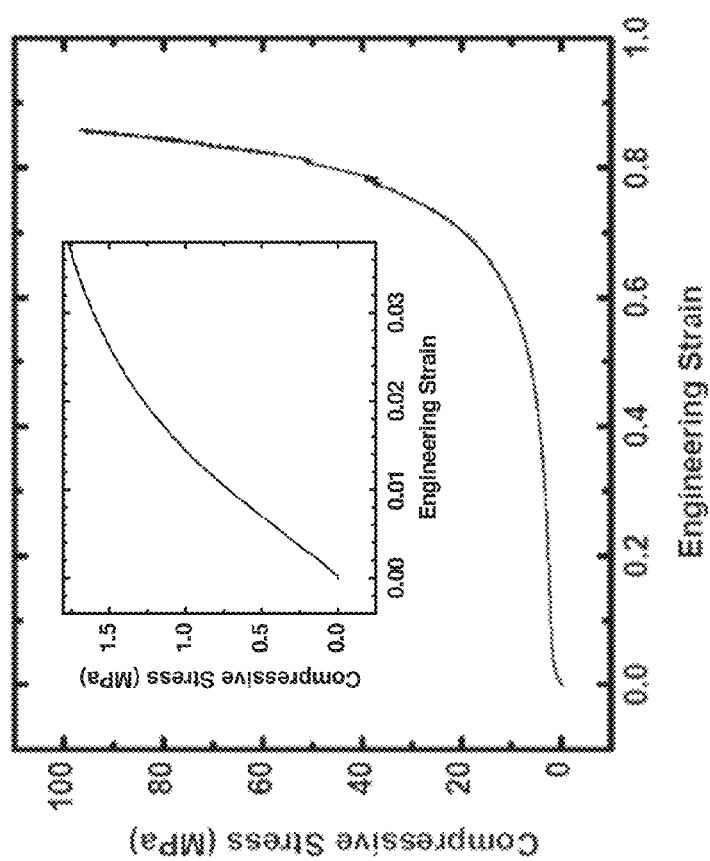
FIG. 16 illustrates a compressive stress-strain curve of polyimide aerogels prepared in accordance with some embodiments.

FIG. 16 depicts behavior under compression (ASTM D1621-04a) of a PI-AMN-190 sample prepared using the 20% w/w solids formulation (Table 1): a short linear elastic range (at <(1.175±0.075)% strain, magnified and shown as an inset) is followed by plastic deformation (up to 50% strain) and inelastic hardening thereafter. The samples did not fail under compression. Other data pertinent to mechanical characterization (averages of two samples): bulk density $\rho_h=0.291\pm0.006$ g cm$^{-3}$; maximum strength (at 86% engineering strain): 99.27±3.64 MPa; specific energy at maximum load (at 86% engineering strain): 48.04±2.48 J g$^{-1}$; Young's modulus (from the slope of the linear elastic range in the inset): 27.25±0.84 MPa; yield strength (stress at 0.2% offset strain): 1.525±0.388 MPa (calculated by drawing a parallel line to the slope of the linear elastic range in the inset, starting from engineering strain=0.002); yield stain (i.e., strain at yield strength): 3.10±0.45; linear elastic to total deformation at the yield point: 0.38.

Pyrolysis of Polyimide Aerogels and Conversion to Carbon

Figure 17:
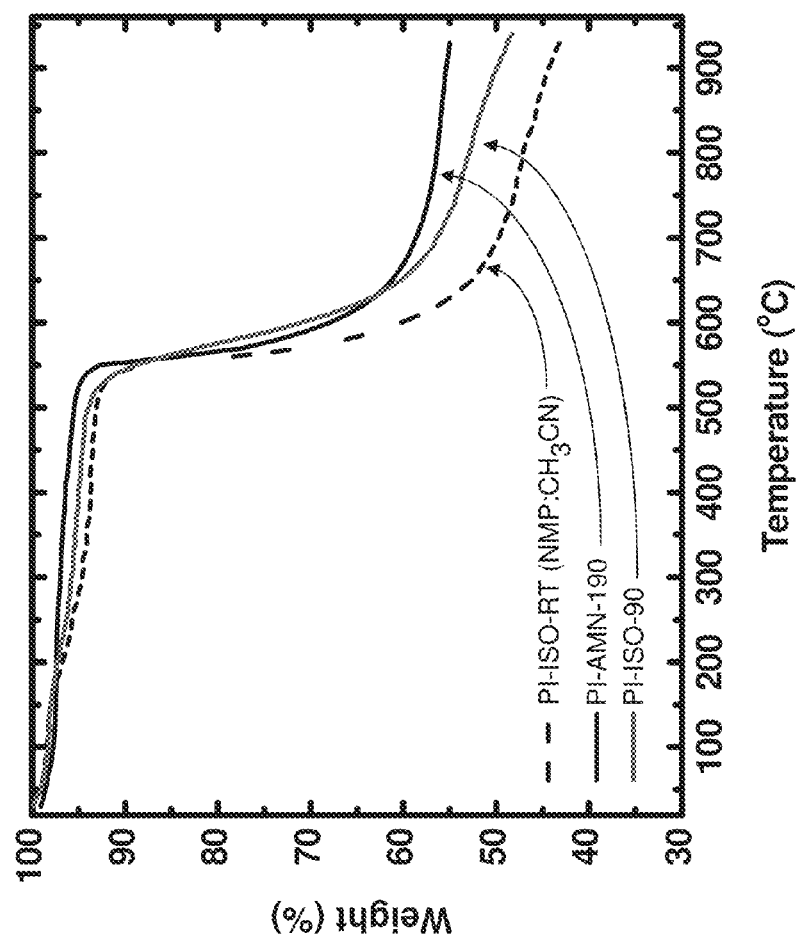
FIG. 17 shows thermogravimetric analysis (TGA) data of polyimide aerogels prepared in accordance with some embodiments.

Porous carbons are pursued as electrodes for fuel cells and batteries. Polyimides generally have good carbonization yields, and in fact the first PI-AMN aerogels reported were also investigated for their conversion to carbon aerogels (pyrolytically) and metal carbide aerogels (carbothermally, after doping with selected sol-gel-derived metal oxides). Carbonizable polymers are capable of either cyclizing, or undergoing ring fusion and chain coalescence by heating. For this the chain should either contain aromatic moieties or be aromatizable (usually by oxidation). In the former case, there is one carbon atom between aromatic rings; otherwise, pyrolytic chain scission will prevail leading to loss of fragments. The PMDA/MDI or MDA polyimides herein fulfill the last criterion. By thermogravimetric analysis under $N_2$ (TGA) both PI-AMN and PI-ISO are stable up to about 550° C., subsequently loosing 40-50% of their mass before 650° C. (presumably by loss of small molecules like CO and $CO_2$). FIG. 17 shows comparative TGA data for samples indicated prepared using 15% w/w solids formulations. The additional gradual mass loss at higher temperatures is attributed to loss of nitrogen-containing fragments. Carbonization pyrolysis was carried out at 800° C. under Ar for 3 h. Pertinent data concerning the resulting carbon aerogels are summarized in Table 2 for various samples prepared with the 15% w/w and the 10% w/w solids formulations (for comparison, refer to Table 1).

Polyimide aerogels remain as quite sturdy monoliths after pyrolysis. Carbon aerogels are also black in color. PI-AMN-derived carbons, however, have a metallic luster, while PI-ISO derived samples are dull. The carbonization yield generally is between 51-56 w/w. Carbon aerogels shrink further beyond their initial imidization shrinkage (Table 1), but PI-ISO-RT samples shrink more (~60%) than the PI-AMN samples (~50%), so that the total shrinkage calculated from the initial molds (Table 2) is approximately the same for both kinds of samples (63-66%). The PI-ISO-90 samples seem to have a small advantage over the rest in terms of shrinkage (overall 52% relative to the molds).

Figure 18:
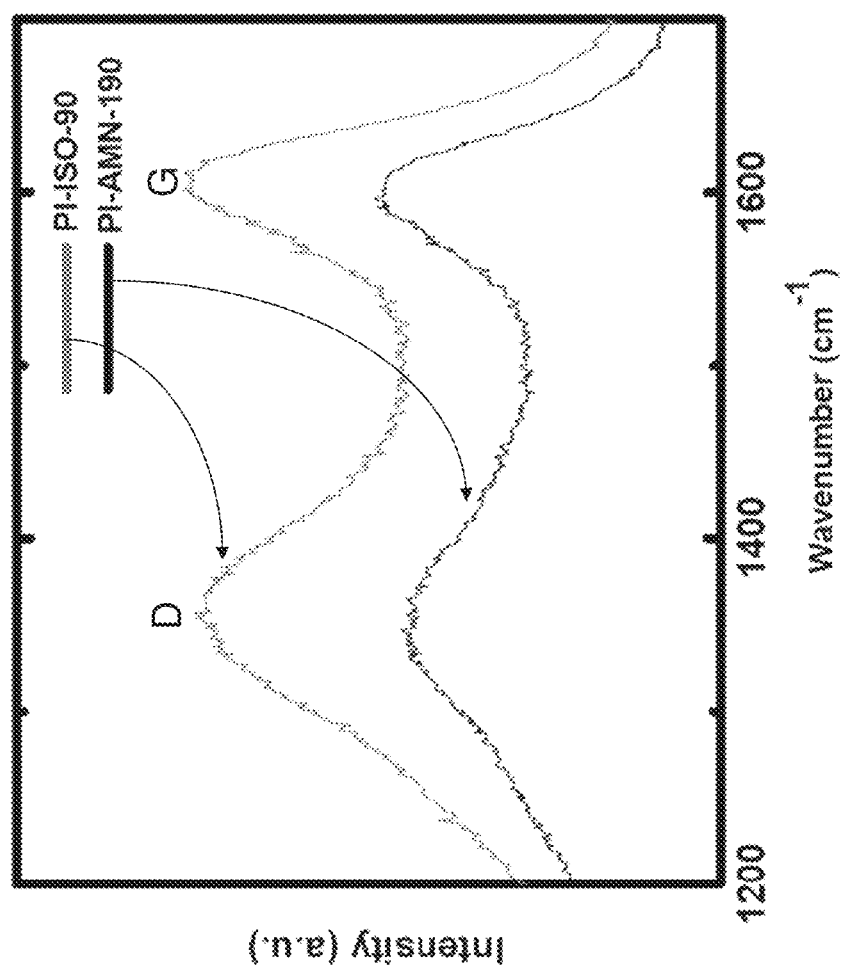
FIG. 18 shows Raman spectra polyimide aerogels prepared in accordance with some embodiments.

Chemically, pyrolytic samples consist only of carbon (as determined by EDS). XRD shows very broad diffractions. Typical Raman spectra show both the G (graphitic) and D (disordered) peaks at 1352 cm$^{-1}$ and 1597 cm$^{-1}$, respectively. FIG. 18 shows Raman spectra of polyimide aerogels prepared by the two routes. The ratios of the integrated peak intensities ($I_D/I_G$) are 1.12 and 0.98 for carbon aerogels obtained from PI-ISO and PI-AMN, respectively, indicating that all carbons are nanocrystalline/amorphous. Indeed, the skeletal densities of all samples are in the 1.7-2.0 g cm$^{-3}$ range (Table 2), which is what is expected from amorphous carbon (1.8-2.0 g cm$^{-3}$). Combination of bulk and skeletal densities yields porosities in the range of ~45% v/v of empty space, which are significantly lower than the porosities of the parent polyimide aerogels (compare Tables 1 and 2). An exception is the PI-ISO-90 samples where the porosity is 67% v/v of empty space and is attributed to their lower pyrolytic shrinkage (Table 2).

Figure 19:
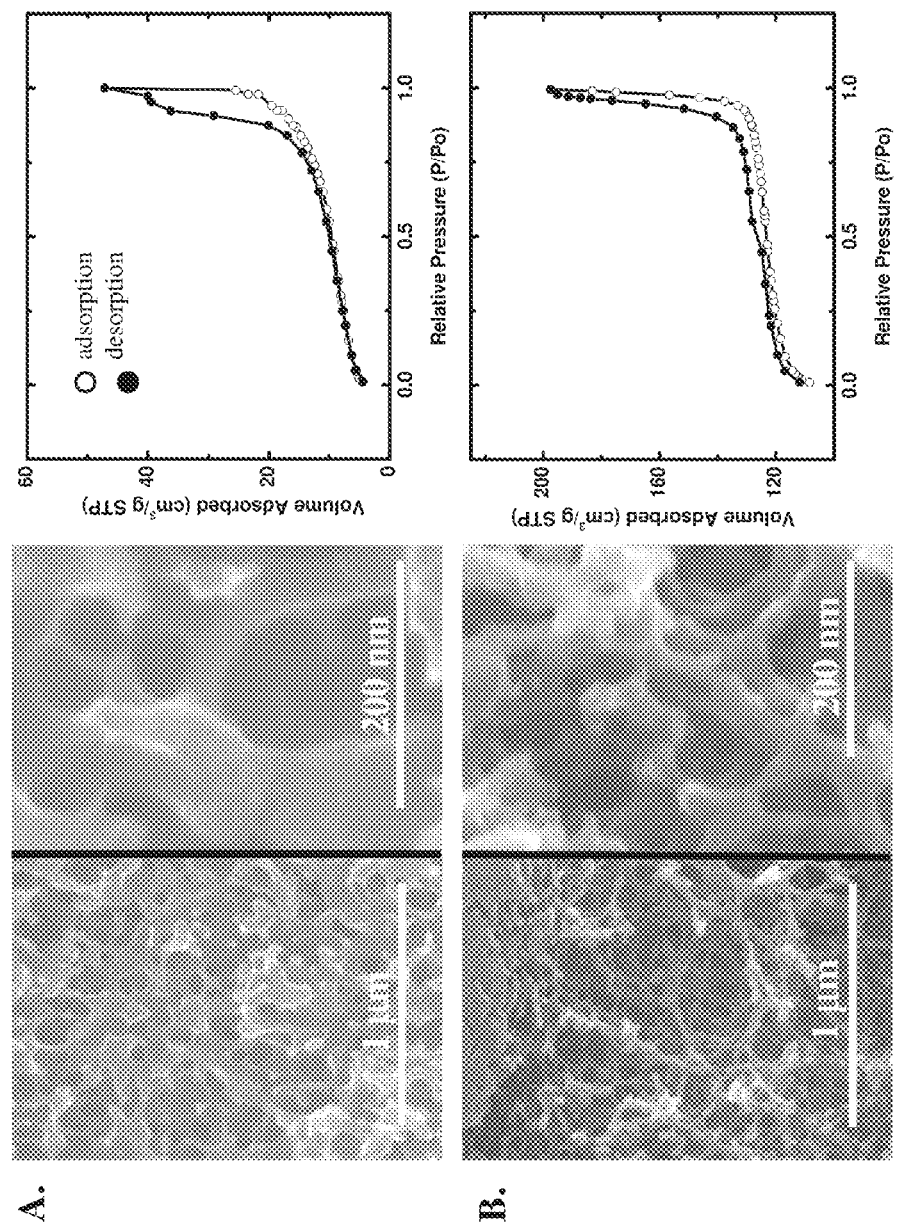
FIG. 19 shows SEM images and nitrogen sorption data for carbon aerogels prepared in accordance with some embodiments.
Figure 20:
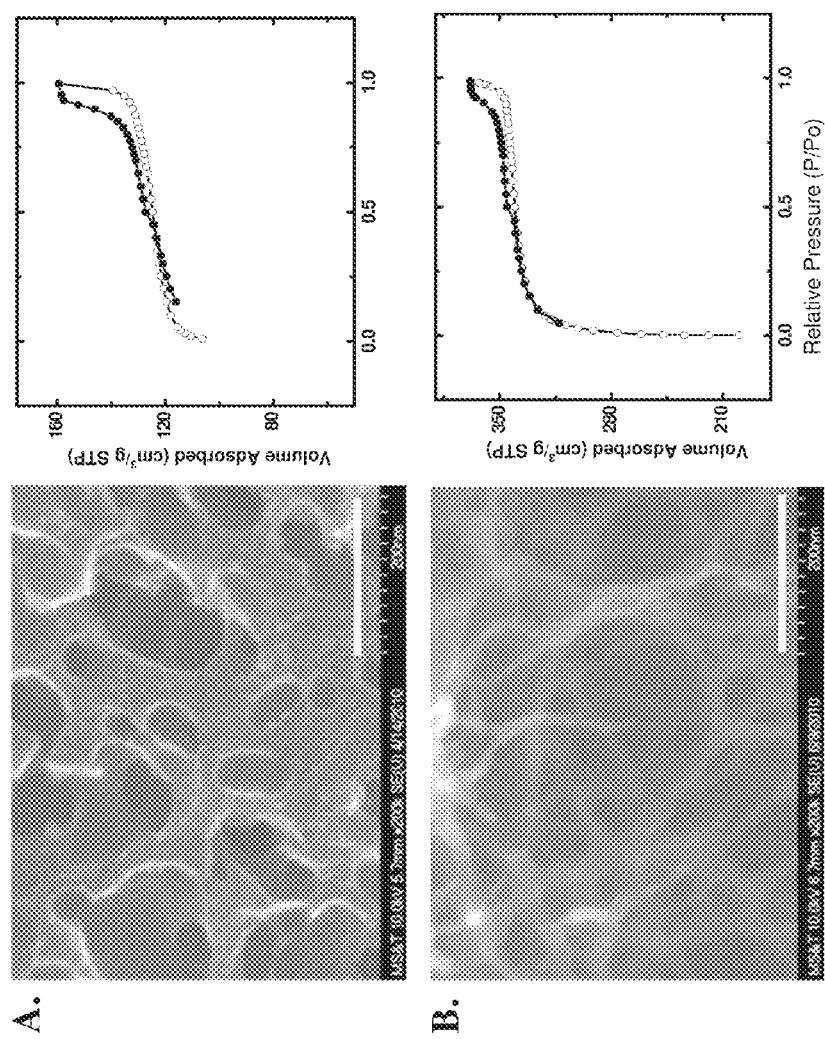
FIG. 20 shows more SEM images and nitrogen sorption data for carbon aerogels prepared in accordance with some embodiments.

Microscopically (by SEM) PI-AMN-derived carbons are different from their parent polyimide aerogels. FIG. 19 shows SEM at two different magnifications and $N_2$-sorption data for carbon aerogels produced by pyrolysis at 800° C. under nitrogen. FIG. 19(A) shows PI-AMN-190 prepared by the 15% w/w solids formulation in NMP; and FIG. 19(B) shows PI-ISO-RT prepared by the 10% w/w solids formulation in NMP/CH$_3$CN 3:1 w/w. FIG. 20 shows SEM data (scale bars at 200 nm) and $N_2$-sorption data for carbon aerogels after etching at 1000° C. under flowing $CO_2$ for 3 h. FIG. 20(A) shows carbon aerogel from PI-AMN-190 prepared by the 15% w/w solids formulation in NMP; and FIG. 20(B) shows carbon aerogel from PI-ISO-RT prepared

TABLE 2

Properties of PI-AMN and PI-ISO derived carbon aerogels[a]

| Precursor for Pyrolytic Carbonization (Sample-Additional Processing) | Carbon Yield % (w/w) | Linear Shrinkage (%)[g] | Bulk Density, $\rho_b$ (g cm$^{-3}$) | Skeletal Density, $\rho_s$ (g cm$^{-3}$)[j] | Porosity, $\Pi$ (% v/v) | BET Surface Area, $\sigma$ (m$^2$ g$^{-1}$) |
|---|---|---|---|---|---|---|
| PI-AMN-190-15 | 58 ± 2[e] | 48.0 ± 0.5 [63] | 1.018 ± 0.153[h] | 1.896 ± 0.070 | 46 | 113 |
| PI-ISO-90-15 | 55 ± 2[e] | 40.8 ± 0.4 [52] | 0.665 ± 0.064[h] | 1.998 ± 0.057 | 67 | 279 |
| PI-ISO-RT-10[b] | 53 ± 2[e] | 61.6 ± 0.9 [64] | 1.012 ± 0.117[i] | 1.863 ± 0.034 | 46 | 336 |
| PI-ISO-RT-10[c] | 53.6 ± 0.4[e] | 62 ± 2 [66] | 0.967 ± 0.160[i] | 1.729 ± 0.021 | 44 | 361 |
| PI-AMN-190-15 3 h-CO$_2$[d] | 79[f] | 3 [63] | 0.701 | 2.114 ± 0.069 | 67 | 417 |
| PI-ISO-RT-10 3 h-CO$_2$[b,d] | 59[f] | 8.7 [65] | 0.670 | 2.310 ± 0.052 | 71 | 1010 |

[a]PI-AMN and PI-ISO samples as indicated, processed at 800° C. under Ar for 3 h.
[b]PI-ISO-RT samples synthesized at in NMP/DMSO.
[c]PI-ISO-RT samples synthesized in NMP/acetonitrile.
[d]Resulting carbon samples processed for an additional 3 h at 1000° C. under flowing $CO_2$.
[e]Average of four samples.
[f]Single sample; yield relative to the sample before treatment with $CO_2$ at 800° C. for 3 h.
[g]Shrinkage = 100 × (sample diameter before pyrolysis − sample diameter after pyrolysis)/(sample diameter before pyrolysis); for the number in the brackets, shrinkage was calculated with respect to the original mold diameter.
[h]Average of two samples.
[i]Average of 3 samples.
[j]Single sample, average of 50 measurements.

by the 10% w/w solids formulation in NMP/DMSO 1:1 w/w. There is a notable rapid rise of the volume adsorbed at low relative pressures, indicating microporosity (pore sizes <2 nm). The structure is dominated by large macropores surrounded by "solid" walls, although $N_2$-sorption isotherms show the presence of all three kind of pores: microporores (significant quick rise of the volume adsorbed at low partial pressures), mesopores (presence of a hysteresis loop), and macropores (second quick rise of the volume adsorbed above $P/P_o$~0.9). The lower BET surface area relative to that of PI-AMN samples before pyrolysis (113 $m^2 g^{-1}$ versus 413 $m^2 g^{-1}$, respectively) is consistent with the changes observed by SEM. On the other hand, PI-ISO-derived carbons retain the fibrous nanomorphology of the parent polyimide aerogels, but the fine structure that could be seen on the fibers of the parent PI-ISO acrogels has been erased. Again, $N_2$-sorption isotherms indicate the presence of all three kinds of pores, while the BET surface area of the PI-ISO-derived carbon aerogels has been increased somewhat relative to that of the parent polyimides (compare Tables 1 and 2). This pyrolytic behavior of both PI-AMN and PI-ISO samples is consistent with the model of FIGS. 6a and 6b: at the early stages of pyrolysis bond breaking and reforming at the surfaces of the primary and secondary particles (case of PI-AMN), leads to rearrangement and a more compact structure. Macroscopically, that mechanism is expected to lead to shrinkage, and microscopically into large voids defined by compact walls (case of PI-AMN). On the other hand, in the case of PI-ISO bond breaking and reforming leads to smoother thinner fibers, but the pore structure is retained.

The presence of micropores indicated by the $N_2$-sorption isotherms suggests that a significant gain in surface area could be achieved by etching. That was carried out under flowing $CO_2$ at 1000° C. (carbon and $CO_2$ comproportionate to CO.) The results are included in Table 2. $CO_2$-treated samples lose 20-40% of their mass, shrink 3-9% and remain monolithic. Consequently, bulk densities decrease, however, skeletal densities increase to the 2.1-2.3 g $cm^{-3}$ range (density of graphite at 2.26 g $cm^{-3}$). The porosity is dominated by the bulk density decrease, reaching up to ~70% v/v of empty space. Microscopically, PI-ISO samples remain fibrous, while PI-AMN samples show macropores similar in shape to those observed before etching. The number of macropores has increased and surrounding walls seem rougher; considering these data together suggests that before etching many pores are masked by a thin porous crust of carbon. After $CO_2$-etching, the $N_2$-sorption isotherms indicate that the majority of the empty space is attributed to micropores, while the BET surface areas of the samples increases dramatically, reaching the levels of the parent polyimide aerogels in the case of PI-AMN-derived carbons (417 $m^2 g^{-1}$), or far surpassing those levels in the case of PI-ISO-derived samples (1010 $m^2 g^{-1}$). For reasons not well understood yet, despite the mass loss $CO_2$-etching increases the electrical conductivity of PI-ISO-derived carbon aerogels by ~70×, from 0.013 mho $cm^{-1}$ (at $\rho_b$=0.967 g $cm^{-3}$) to 8.697 mho $cm^{-1}$ (at $\rho_b$=0.670 g $cm^{-3}$). (By comparison the electrical conductivity of $CO_2$-etched PI-AMN-derived carbon aerogels is 4.491 mho $cm^{-1}$ at $\rho_b$=0.701 g $cm^{-3}$.) Those values render polyimide-derived carbon aerogels particularly attractive as electrochemical electrodes.

Three-dimensional porous polyimide and carbon networks derived therefrom, such as polyimide and carbon aerogels, are high value-added materials and may be useful for a number of applications. For example, such porous polyimide networks may be useful in high-temperature thermal insulation (e.g., architectural, automotive industrial applications, aircraft, spacecraft, clothing), lightweight structures, acoustic insulation (e.g., buildings, automobiles, aircrafts), impact dampening, dielectrics (e.g., for fast electronics), supports for catalysts, and as hosts of functional reactants for chemical, electronic and optical applications. In some embodiments, three-dimensional porous networks described may be used as insulation material for apparel, such as clothing, astronaut suits, and armor.

Described herein are three-dimensional porous polyimide networks synthesized via a low temperature process through a reaction of dianhydrides with diisocyanates. Although MDI has been used, other monomers such as 4,4'-oxybis (phenylisocyanate) may behave similarly and resulting polyimides may have the chemical composition of Kapton. Three-dimensional porous polyimide networks (e.g., polyimide aerogels) derived from PMDA/MDI may exhibit fibrous morphologies and can be converted pyrolytically to isomorphic three-dimensional porous carbon networks (e.g., carbon aerogels), which, owing to their large surface area, may be useful for their reactivity with nanoparticulate oxidizing agents.

Three-dimensional porous polyimide networks including polyimide aerogels may be useful in applications that involve, for example, absorption of oil or other hydrophobic materials. In some instances, such materials may be capable of absorbing 5, 15, 20, 25, or more times their weight in oil or other hydrophobic material. In some instances, the majority of the substance absorbed may be retrieved by chemical and/or mechanical methods. Three-dimensional porous carbon networks derived from three-dimensional porous polyimide networks may also be useful for a number of applications including, for example, manufacture of electrodes, batteries, supercapacitors, high-temperature insulators, high-temperature ballistics materials, ablative materials and infrared blocking armor. In some embodiments, doping PI-ISO with cerium oxide and pyrolysis to carbon under argon may lead to materials that are self ignited when exposed to air, giving rise to potential energetic materials applications.

Having thus described several aspects of at least one embodiment of this invention, it is to be appreciated various alterations, modifications, and improvements will readily occur to those skilled in the art. Such alterations, modification, and improvements are intended to be part of this disclosure, and are intended to be within the spirit and scope of the invention. Accordingly, the foregoing description and drawings are by way of example only.

What is claimed is:

1. A method of manufacturing a polyimide aerogel, the method comprising:
   mixing an anhydride and 4,4'-diisocyanatodiphenylmethane in a solvent to form a sol-gel material; and
   drying the sol-gel material to form the polyimide aerogel.

2. The method of claim 1, wherein the solvent comprises a pyrrolidone.

3. The method of claim 1, wherein the anhydride is pyromellitic dianhydride.

4. The method of claim 1, wherein the solvent further comprises acetonitrile, acrylonitrile, and/or acetone.

5. The method of claim 1, further comprising a step of subjecting the sol-gel material to solvent-exchange using a pyrrolidone, acetonitrile, and/or acetone.

6. The method of claim 1, wherein the drying the sol-gel material includes supercritical drying of the sol-gel material.

7. The method of claim 1, wherein the drying the sol-gel material includes subcritical drying of the sol-gel material.

8. The method of claim 1, further comprising pyrolyzing the polyimide aerogel to form a carbon network.

9. The method of claim 8, wherein the carbon network is chemically etched to produce a carbon network having increased microporosity.

10. The method of claim 2, wherein the pyrrolidone is N-methyl-2-pyrrolidone.

11. A method of manufacturing a polyimide aerogel, and forming a carbon network from the polyimide aerogel, the method comprising:
mixing an anhydride and an isocyanate in a solvent to form a sol-gel material;
drying the sol-gel material to form the polyimide aerogel; and
pyrolyzing the polyimide aerogel to form a carbon network, wherein the carbon network is chemically etched to produce a carbon network having increased microporosity.

12. The method of claim 11, wherein the solvent comprises a pyrrolidone.

13. The method of claim 11, wherein the anhydride is pyromellitic dianhydride.

14. The method of claim 11, wherein the solvent further comprises acetonitrile, acrylonitrile, and/or acetone.

15. The method of claim 11, further comprising a step of subjecting the sol-gel material to solvent-exchange using a pyrrolidone, acetonitrile, and/or acetone.

16. The method of claim 11, wherein the drying the sol-gel material includes supercritical drying of the sol-gel material.

17. The method of claim 11, wherein the drying the sol-gel material includes subcritical drying of the sol-gel material.

18. The method of claim 11, wherein the isocyanate comprises a diisocyanate and/or a triisocyanate.

19. The method of claim 12, wherein the pyrrolidone is N-methyl-2-pyrrolidone.

* * * * *

UNITED STATES PATENT AND TRADEMARK OFFICE
CERTIFICATE OF CORRECTION

PATENT NO. : 9,745,198 B2
APPLICATION NO. : 14/261399
DATED : August 29, 2017
INVENTOR(S) : Nicholas Leventis et al.

It is certified that error appears in the above-identified patent and that said Letters Patent is hereby corrected as shown below:

In the Specification

Column 5, Line 36, the word "nanofibcrs" should be "nanofibers"

Column 5, Lines 58-59, the word "4,4'-diisocyanatodiphenylmcthanc" should be "4,4-diisocyanatodiphenylmethane"

Column 7, Line 50, the word "polyimidcs" should be "polyimides"

Column 20, Line 21, the word "nanoparticulatc" should be "nanoparticulate"

Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*